US009369457B2

(12) United States Patent
Grajek et al.

(10) Patent No.: US 9,369,457 B2
(45) Date of Patent: *Jun. 14, 2016

(54) MOBILE MULTIFACTOR SINGLE-SIGN-ON AUTHENTICATION

(71) Applicant: SecureAuth Corporation, Irvine, CA (US)

(72) Inventors: Garret Florian Grajek, Aliso Viejo, CA (US); Jeff Chiwai Lo, Irvine, CA (US); Robert Jason Phillips, Phoenix, AZ (US); Shu Jen Tung, Irvine, CA (US)

(73) Assignee: SecureAuth Corporation, Irvine, CA (US)

( * ) Notice: Subject to any disclaimer, the term of this patent is extended or adjusted under 35 U.S.C. 154(b) by 114 days.

This patent is subject to a terminal disclaimer.

(21) Appl. No.: 14/316,657

(22) Filed: Jun. 26, 2014

(65) Prior Publication Data
US 2015/0007299 A1    Jan. 1, 2015

Related U.S. Application Data

(63) Continuation of application No. 13/830,506, filed on Mar. 14, 2013, now Pat. No. 8,769,651.

(60) Provisional application No. 61/703,045, filed on Sep. 19, 2012.

(51) Int. Cl.
*H04L 29/06* (2006.01)
*G06F 17/30* (2006.01)
(Continued)

(52) U.S. Cl.
CPC ...... *H04L 63/0815* (2013.01); *G06F 17/30876* (2013.01); *G06F 21/31* (2013.01);
(Continued)

(58) Field of Classification Search
None
See application file for complete search history.

(56) References Cited

U.S. PATENT DOCUMENTS 6,192,361 B1 * 2/2001 Huang ............ H04L 63/083
455/26.1
6,907,455 B1 * 6/2005 Wolfe .............. H04L 67/26
704/260

(Continued)

FOREIGN PATENT DOCUMENTS

EP    1368722    8/2007

OTHER PUBLICATIONS

Gros (Thomas Groβ, "Security Analysis of the SAML Single Sign-on Browser/Artifact Profile", IMB Zurich Research Laboratory, 2003).*
(Continued)

*Primary Examiner* — Peter Poltorak
(74) *Attorney, Agent, or Firm* — Knobbe, Martens, Olson & Bear, LLP

(57) ABSTRACT

Features are disclosed for authentication of mobile device applications using a native, independent browser using a single-sign-on system. An authentication module within the mobile application can direct the mobile device's native browser to a URL to initiate authentication with an authentication appliance. The mobile browser can receive and store a browser-accessible token to indicate previous authentication performed by the user. The mobile application can receive from the application appliance and store a client application ID token that may be presented to network services for access. A second mobile device application may direct the same browser to the authentication appliance. The authentication appliance may inspect the persistent browser-accessible token and issue a second client application ID identity to the second application without collecting additional authentication information, or collecting additional authentication information that is different from the first authentication information.

15 Claims, 13 Drawing Sheets

(51) Int. Cl.
   *G06F 21/31* (2013.01)
   *G06F 21/41* (2013.01)

(52) U.S. Cl.
   CPC .............. *G06F 21/41* (2013.01); *H04L 63/08* (2013.01); *H04L 63/083* (2013.01); *H04L 63/0823* (2013.01); *H04L 63/168* (2013.01); *H04L 2463/082* (2013.01)

(56) References Cited

U.S. PATENT DOCUMENTS

| | | | |
|---|---|---|---|
| 6,954,799 B2 | 10/2005 | Lerner | |
| 8,132,242 B1* | 3/2012 | Wu | H04L 63/0884 713/168 |
| 8,281,149 B2* | 10/2012 | Laurie | G06F 21/31 709/217 |
| 8,510,816 B2* | 8/2013 | Quach | H04L 9/3215 726/7 |
| 8,745,718 B1* | 6/2014 | Dufel | H04L 63/0807 713/155 |
| 8,996,857 B1* | 3/2015 | Akella | H04L 63/0815 713/153 |
| 2003/0061512 A1* | 3/2003 | Flurry | H04L 63/0815 726/4 |
| 2003/0182551 A1 | 9/2003 | Frantz et al. | |
| 2004/0054898 A1* | 3/2004 | Chao | H04L 63/08 713/168 |
| 2004/0210771 A1 | 10/2004 | Wood et al. | |
| 2004/0250118 A1* | 12/2004 | Andreev | H04L 63/0815 726/8 |
| 2006/0025670 A1 | 2/2006 | Kim et al. | |
| 2006/0218630 A1 | 9/2006 | Pearson et al. | |
| 2007/0022196 A1 | 1/2007 | Agrawal | |
| 2007/0039043 A1 | 2/2007 | Garskof | |
| 2008/0077791 A1 | 3/2008 | Lund et al. | |
| 2008/0077796 A1* | 3/2008 | Lund | H04L 63/0869 713/173 |
| 2008/0077809 A1* | 3/2008 | Hayler | G06F 12/1466 713/193 |
| 2009/0240936 A1* | 9/2009 | Lambiase | H04L 63/0272 713/156 |
| 2009/0249439 A1 | 10/2009 | Olden et al. | |
| 2009/0292927 A1 | 11/2009 | Wenzel et al. | |
| 2010/0257358 A1 | 10/2010 | Grajek et al. | |
| 2010/0263037 A1 | 10/2010 | Sirota | |
| 2010/0306547 A1* | 12/2010 | Fallows | G06F 21/305 713/178 |
| 2010/0325626 A1 | 12/2010 | Greschler et al. | |
| 2011/0099618 A1 | 4/2011 | Mutt | |
| 2011/0119747 A1* | 5/2011 | Lambiase | G06F 21/335 726/8 |
| 2011/0209208 A1* | 8/2011 | Quach | H04L 9/3215 726/7 |
| 2011/0264913 A1 | 10/2011 | Nikander et al. | |
| 2012/0023565 A1* | 1/2012 | Tumanyan | G06F 21/41 726/8 |
| 2012/0159195 A1* | 6/2012 | von Behren | G06Q 20/3552 713/193 |
| 2012/0216244 A1* | 8/2012 | Kumar | G06F 21/57 726/1 |
| 2013/0024919 A1* | 1/2013 | Wetter | G06F 21/335 726/6 |
| 2013/0086657 A1* | 4/2013 | Srinivasan | H04L 63/10 726/6 |
| 2013/0086669 A1 | 4/2013 | Sondhi et al. | |
| 2014/0325621 A1* | 10/2014 | Sanin | G06F 21/41 726/5 |

OTHER PUBLICATIONS

Air-Watch SDK/Mobile App Wrapping http://www.air-watch.com/solutions/mobile-application-management/app-wrapping-and-sdk, 2013.

Citrix "Wrapping Android an iOS Mobile Applications" http://support.citrix.com/proddocs/topic/apppreptool/clg-appwrap-manage-wrapper-con.html, 2013.

Gralla et al., "How the Internet Works", 8*th* edition, ISBN 13:978-0-7897-3626-0, Nov. 2006.

F5 Mobile App Manager http://www.ciosummits.com/media/solution_spotlight/mobile-app-manager-datasheet1.pdf, 2013.

Symantec Mobile App Center http://www.symantec.com/app-center, 2013.

International Search Report and Written Opinion issued in PCT/US2013/058268, dated Dec. 27, 2013.

* cited by examiner

MOBILE MULTIFACTOR SINGLE-SIGN-ON AUTHENTICATION

CROSS-REFERENCE TO RELATED APPLICATIONS

This application is a continuation of U.S. patent application Ser. No. 13/830,506 filed on Mar. 14, 2013, soon to issue as U.S. Pat. No. 8,769,651, which claims priority from provisional U.S. Pat. App. No. 61/703,045, filed on Sep. 19, 2012, each of which are hereby incorporated by reference in their entirety.

BACKGROUND

Mobile devices, such as smartphones, tablets, and notebooks, often have native applications written specifically for that mobile device and/or the operating system running on the mobile device. Such native applications often communicate with other computing devices over a network such as the Internet, where the other computing devices will deliver content or services to the mobile device's native application. The networked native application executing on the mobile device can be referred to as a client app, and the computing devices in communication with the client app may be referred to as servers.

Servers do not necessarily trust the client apps, or the users of the client apps. Often before substantive communication begins between a client app and a server, the server must authenticate and authorize the client app. For example, a client app that allows a user to access their bank accounts communicates with a bank's server. Because access to a bank account is sensitive and should be restricted only to the owner of the bank account, the server requires the mobile device, client app and/or client app user to identify and authenticate itself.

A user may have multiple client apps going to the same enterprise. Each individual client app may force the user to authenticate multiple times using the same credentials within a single usage period, thus creating authentication and authorization redundancy.

Multiple client apps often reside on the same mobile device. However, mobile device platform restrictions often prevent interprocess communication between client apps. This restriction can create multiple redundant authentication or logoff requests when accessing associated network resources. For example, a user may have one client app on their mobile device to access an enterprise HR system, and another client app to mange their enterprise customer relationship management (CRM) system. The user may choose to have his mobile device first execute the HR app, which requires authentication to a n enterprise's HR servers The user may then choose to have his mobile device access the CRM system, also requiring authentication using the same enterprise wide identification. In other words, a user and/or mobile device may be forced to authenticate several times within a relatively short time period when multiple computing services are accessed through multiple client apps that use the same or a related identity. When the user logs out of his banking app, the investment app may remain logged in despite both apps relying on the same credentials. This unintended consequence may create a security risk where a user may believe he or she is logged out of all applications using a specific credential, but actually remains logged into one or more other applications.

SUMMARY

Embodiments of the systems, methods, and devices described herein overcome problems of the prior art and enable management of single-sign-on systems for mobile applications used in an enterprise.

Some embodiments include receiving, from an independent browser on a mobile device, a first request to access a first uniform resource locator (URL) associated with a first mobile application executing on the mobile device. An appliance may then authenticate the user interacting with the mobile device at least partly by: receiving first authentication information related to the user from the independent browser, and verify the first authentication information with an identity database. The authentication appliance may then send, to the independent browser, a browser-based token and a first client application identity related to the user. The appliance may then receive, from the independent browser on the mobile device, a second request to access a second uniform resource locator (URL) associated with a second mobile application executing on the mobile device, wherein the second request comprises the browser-based token. The appliance may verify, with the identity database, non-revocation of the browser-based token, and finally send, to the independent browser, a second client application identity related to the user.

These and other features and advantages of embodiments will become apparent from the following description of embodiments. Neither this summary nor the following detailed description purports to define the invention.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION OF SPECIFIC EMBODIMENTS

Introduction to Mobile Single-Sign-On (Mobile SSO)

Figure 1:
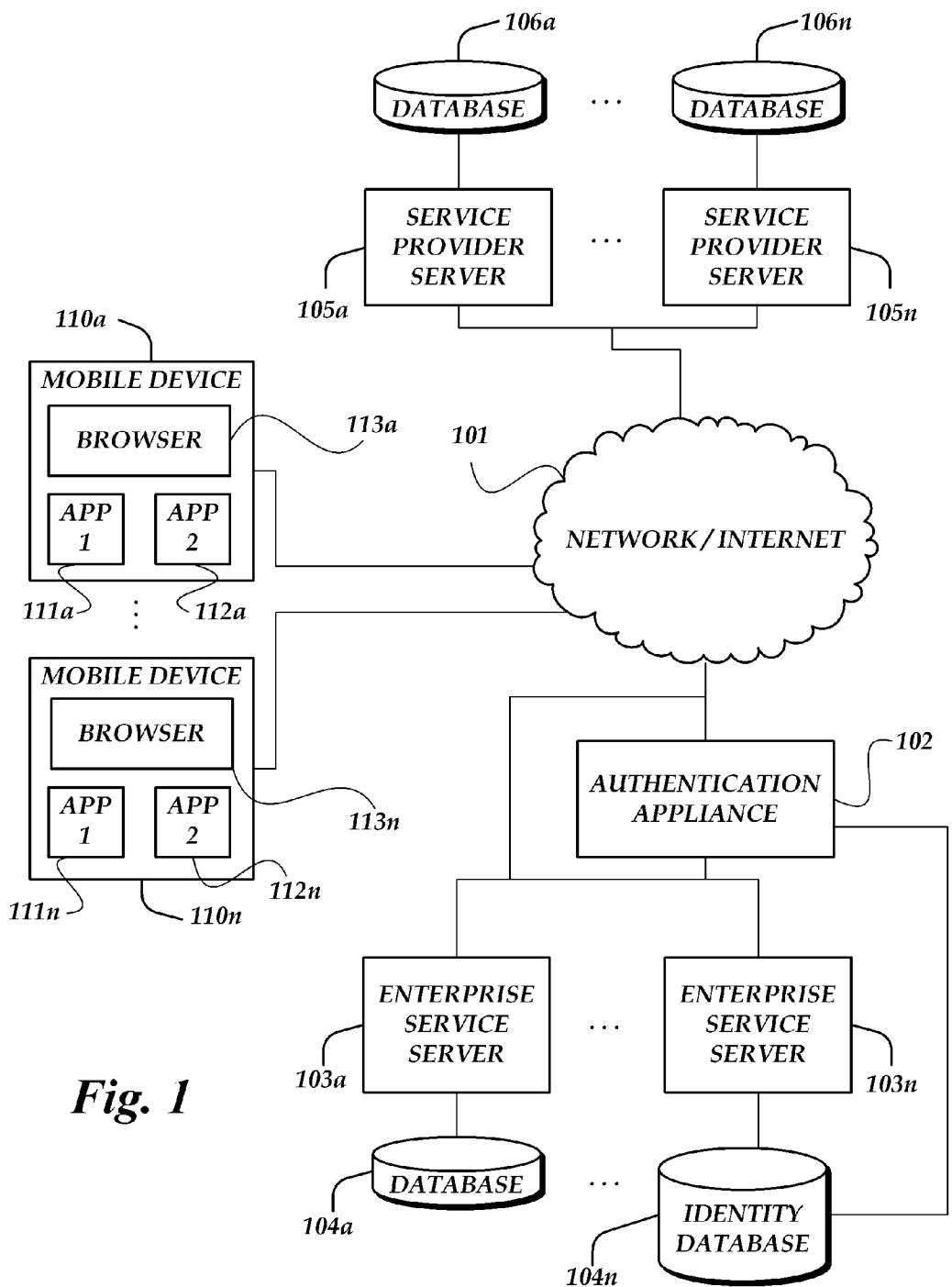
FIG. 1 is a block diagram of illustrative network(s) including multiple client devices with multiple client apps, multiple services and servers, and authentication mechanisms.

The present disclosure is directed to providing single sign-on authentication for native mobile device applications. Specifically, the disclosure relates to a single sign-on process in which mobile applications authenticate through interactions with a browser that runs on the mobile device, and through the use of a persistent token or credential stored by the browser. For example, in one embodiment, applications running on smartphone operating systems, such as Apple's iOS and Google's Android and the Windows RT, use the OS's native, independent browser (e.g. Safari, Chrome, Internet Explorer or any web browser downloaded and installed by the user separate from a mobile application designed for a specific purpose, etc.) to perform authentication. The disclosure allows native mobile applications ("client apps") without integrated web browsers to leverage web or non-web single sign-on technology to perform authentication and authorization for a single identity.

To leverage traditional single-sign on technology, a mobile application may need to be modified to interact with an independent browser to perform authentication. For example, an application developer (or any other entity) could insert into his mobile application an authentication module that handles interaction with the web browser. The authentication module can comprise snippets of code that, when compiled and executed, direct a web browser to access a specific URL, and/or receive data from the web browser, directly or indirectly, after authentication has completed.

When the native client app attempts to access a network-based application resource, such as those provided by a server, the client app may need to conduct authentication of the user or mobile device. To perform the required authentication process, or to determine whether any authentication is required, the client app may invoke the authentication module. The authentication module may determine whether there is already a stored client app identity for the authentication module to access. If no client app identity is found, the authentication module may open the mobile device's native, independent browser to perform authentication for the user of the mobile device. The authentication module may direct the native browser to a URL associated with web based authentication.

For example, the browser may be directed to the URL of a web authentication server, also known as an authentication appliance. Authentication servers/appliances may be operated by a specific enterprise to authenticate its users. For example, Adobe's IT department might run an authentication server for all of Adobe's employees to verify employees' authentication credentials, such as usernames, passwords, or other identifying information described herein. Alternatively, an authentication server may be operated by a third party to authenticate an enterprise's users, or user's subscribing to the enterprise's or the third party's services. Authentication servers/appliances may provide authentication services for a variety of applications that require authentication, such as restricted local features/applications on a computer or mobile device, or network-based application services such as web services, email, calendaring, etc.

Such a server may negotiate the method of authentication which can involve the browser sending a user's or mobile device's credentials to the server. The authentication server may verify the credentials by accessing an identity database, such as Microsoft's Active Directory. Once a user has authenticated, the web authentication server may send back to the mobile device, via the browser, a token intended to be used and stored by the browser, and an identity for use by the client app.

The token is a persistent identity token or credential sent to the browser, such as a browser cookie, to be stored by the browser on the mobile device—or a X.509v3 certificate stored in a native key store or some other file repository. The persistent token may contain, among other data, the user's identity, an identifier of the enterprise affiliated with the user, the delivery time of the credential, and the credential's expiration time. This identity token can be presented to the authentication server to verify a previous authentication by the user or mobile device. A session token associated with the persistent token may also be stored in the browser (e.g. by using an HTML4 cookie and/or HTML5 session objects). The session token may be issued by the authentication appliance to indicate that the persistent token was either recently issued or verified. The session token may be presented to the authentication appliance by the browser to bypass reauthentication (or verification of a persistent token) as validation that a single-sign-on session is active and other mobile apps may pass through without authentication.

Another identity token is a client app identity sent to the client app, which may be an encrypted or unencrypted URL string and/or a browser header (including a cookie or encrypted cookie) or other data that identifies the user. Such a client app identity may comprise a user's identity and, in some embodiments, a signature to verify authentication of that identity. Based on this client app identity, the client application or any network-based application may determine if the client app's user may access the services provided via authorization based on the enterprise data store or other on-premise or off premise resource.

The client app may receive this identity directly from the browser as sent from the web server functioning on the authentication appliance. If the browser is not able to return data to the client app, or if the identity is encrypted, the client app's authentication module may receive the client app identity directly from the authentication appliance via a directed webservice call.

If, at a later time, the client app requires access to the same server or service in the future, the client app may search for and use the same stored client app identity. The client app may use the resident client app identity without using the browser or authentication server to access local mobile device, enterprise, or cloud application services that trust the identity.

In some embodiments, the client app may be configured to require the browser-based user validation each time the client app requires use of an identity. In this type of embodiment, the client app can be assured that the identity is valid, the user is in the right authorization groups and the related browser-accessible persistent token has not been revoked—for the purposes of a lost/stolen mobile device or any other reason that would revoke a user credential (identity terminated, etc.). Tracking revocation may include the authentication appliance storing a list of valid tokens, or involve a time-based stamp method utilizing an enterprise datastore specifying admin-modified revocation times (such as the method described in patent application Ser. No. 12/419,951, which is fully incorporated into this application in its entirety).

A second client app on the same mobile device may also attempt to access local or network-based application services that depend upon a specific identity. Like the client app described above, when the second client app attempts to access a network service it may need its user to authenticate, and will invoke an authentication module. The authentication module may determine whether there is already a stored client app identity within the second client app that can be used for the service to access. If no client app identity is found, the authentication module associated with the second client app may open the mobile device's native browser to perform authentication for the user who using the mobile device. The authentication module may direct the native browser to a URL associated with web based authentication.

When the first client app uses the browser to authenticate, the browser stores a persistent token associated with that authentication, and a related session token. In some alternative embodiments, the persist token may be considered to be the session token, in that it may only be valid during one browser session or other short time period. The browser may later send the persistent or session token to the URL specified by the second client app. The authentication server responsive to that URL may inspect and verify the persistent token or session token and, if satisfied, not perform additional authentication. This technique of accepting the persistent/session token in lieu of user authentication information has the effect of providing a single-sign on (SSO) between the (2) native mobile applications—the user can effectively authenticate once by interacting with either app, and have that authentication apply to both applications. Alternatively, if not satisfied, the authentication server may require re-authentication or additional authentication of a type different than used for the original authentication.

Once satisfied, the authentication server will create a client app identity (e.g. userid or userid and domain pair) for use by the second client app (for use by the second client app however it sees fit) and send the identity via the browser to the app. The second client app will receive the client app identity token from the browser or directly from the authentication appliance as described above. The second client app may then utilize this identity for identification of a user and for persistent access to the app if it so chooses.

The authentication appliance is able to create the client app identity by using a stored table of client apps IDs to mobile applications, where the authenticated credentials are used as a "key value" (e.g. jdoe). Via a lookup in the table, a client app ID may be returned that may be based on the key value. For example, a client app ID for a specific application may comprise the key value or a programmatical variant of the key value (jdoe@gmail.com) or a completely new attribute associated to the key value and stored to be used when sent to the specific client app (jdoe-ca-31132). Client app IDs formats and values may vary from application to application, depending on what kind of ID a mobile application is expecting to consume.

Additionally, once logged in, a user may logout via the first client app. When a user logs out, the application may direct the browser to access the authentication appliance at a specific logout URL. The logout URL may trigger the authentication appliance to remove the persistent and/or session token from the set of valid persistent tokens, and instructs the browser to delete the session and/or persistent token on the mobile device. In some embodiments, the browser may then launch the second client app, for example using a URL-mapping, passing an instruction to the second application to logout the same user from the second application. The second application may then invoke one or more additional applications, either directly or through the browser, to invoke a similar logout procedure for those applications.

Thus, as described herein, single-sign on authentication processes, systems and methods for mobile devices are disclosed. For example, a user can first authenticate via the independent browser to an enterprise's authentication appliance while interacting with one mobile application on their smartphone. A second mobile application on their smartphone can also be configured to use the independent browser for authentication. However, because the user already authenticated a first time using the independent browser, when the second mobile application directs the independent browser to a URL associated with the authentication appliance, the persistent token or session token can be read and a client app identity issued automatically without any additional interaction from the user. In other words, based on this disclosure, a user may "sign on" once, and have that "single" sign on apply across multiple mobile applications without additional user intervention. Additionally, because the mobile app single-sign on process uses an independent browser to perform authentication, the disclosed single-sign on processes also allow for single-sign on to web servers and services accessed via the independent browser.

Although aspects of the embodiments described in the disclosure will focus, for the purpose of illustration, on relationships and interactions between mobile devices, client apps, authentication servers, and network services, one skilled in the art will appreciate that the techniques disclosed herein may be applied to any number of hardware or software processes or applications. For example, although the disclosure focuses primarily on the context of smartphones, the disclosed processes can also be used with other types of mobile devices, such as tablets and e-readers. Further, although various aspects of the disclosure will be described with regard to illustrative examples and embodiments, one skilled in the art will appreciate that the disclosed embodiments and examples should not be construed as limiting. Various aspects of the disclosure will now be described with regard to certain examples and embodiments, which are intended to illustrate but not limit the disclosure.

In addition to apps that the enterprise creates designed to interact with the authentication server, systems and methods described herein also are compatible with third party native mobile apps that have pre-defined URLs mappings. The systems and methods can tie these applications into both the single-sign-on logon and logoff disclosed herein.

Operational Environment

FIG. 1 is illustrative of a sample computer network that includes multiple client devices with multiple client apps, multiple services and servers, and authentication mechanisms.

A client app may operate in a complex computer and networking environment. Client apps, 111a to 111n, and 112a to 112n, are software applications that are written to execute on a mobile device, typically a smartphone. Client apps are usually native software, in that they can only function within their native architecture or operating system. For example, an application designed for Apple's iOS operating system and written in Objective C will not function on Google Android phones. Client apps may be downloaded or installed on a mobile device using cloud distribution channels. For example, Apple's iPhone product has the ability to download iOS client apps from the iTunes service, and Android phones can download Android client apps from Google Play.

Mobile devices, such as smartphones like the iPhone or Android device, are preinstalled with native web browsers 113a to 113n. Such browsers allow mobile users to access various Uniform Resource Locators (URLs). These web browsers have most of the capabilities of normal web browsers such as sending and receiving HTTP and HTTPS communications, running client side managed code such as Java and Javascript, and rendering various received data. Mobile browsers can store received information in a variety of data stores, including standard HTML4 browser cookie space, HTML5 storage space, including HTML5 Local Storage, HTML Session Storage, HTML5 Global Storage, HTML SQLLight Storage, Adobe Flash Space, Android Dalvik Storage space, J2MEManaged code space, Microsoft.NET code space, and Native X.509v3 Certificate storage space and SDROM file space.

Client apps may also have integrated browser capabilities (not shown). However, some integrated browsers cannot access the data stores accessible by a mobile device's native web browsers 113a to 113n or other integrated browsers. In these cases, if a client app's integrated web browser on a mobile device is used to authenticate to a service or server, another client app on the same device may not be able to access that authentication information. This causes other client apps on the same device to have to re-authenticate their device or user each time a client app is launched to access network services. Users having to frequently re-authenticate on their mobile devices, where it may be difficult to type or input credentials, wastes user time. Thus, the advantages and uses of single-sign-on authentication may be limited when exchanging authentication information with an integrated browser that has limited access to outside data stores.

Mobile devices 110a to 110n are usually connected to the global internet via wireless networking. Typical network connectivity involves either an 802.11 Wi-fi connection, or other 3G or 4G cellular data technology, such as GSM, EDGE, UMTS, WCDMA, EV-DO, LTE, etc. Such connectivity allows the mobile device, browser, and client apps to communicate to resources on TCP/IP networks, or other OSI layer 3 networks, such as the Internet 101. Resources that can be contacted include, by way of example, enterprise services 103a to 103n, network services provided by a third party (such as Google Apps) 105a to 105n, and authentication servers or appliances 102 that provide authentication services for such resources.

An authentication appliance 102 is a server or multiple servers that resides either on a corporate or organizational enterprise's network, or as a cloud service external to the enterprise (not shown). It is also sometimes known as an authentication, logon, authorization or security service. Such an appliance allows users and/or devices to authenticate prior to gaining access to network services, such as those provided by enterprise service servers 103a to 103n. Authentication appliances may access an identity database 104n to verify credentials received from device, and/or lookup any authentication or authorization information associated with a user or device. Such an identity database 104n can include, by way of example, SQL databases, Microsoft Active Directory servers, LDAP directories, Kerberos servers, certificate servers, RADIUS servers, or any other database, on premises or in the cloud (i.e. hosted off-site by, in some cases, a third party), that stores or authenticates user credentials and/or profiles. After the authentication process takes place, the authentication appliance can send identities/token(s) to store on the device for future use. These identities/tokens may be presented to the authentication appliance or other server to gain access to local or network-based application services. The identities/tokens can be utilized as an SSO identifier to assist in native mobile app to native mobile app single-sign on (SSO). Likewise, the identities/tokens can be utilized as an SSO identifier to assist in native mobile app to web app single-sign on (SSO) because the independent browser has received and has access to the identities/tokens returned after authentication.

Enterprise services, which are provided by enterprise servers 103a to 103n at the application layer, provide client apps access to enterprise databases and web servers information through TCP/IP networking or other OSI layer 3 networking. Examples of such services include calendaring, email, document management, file services, or any other application that uses a client/server architecture. Enterprise services usually accept authenticated identities from client apps that are associated with the same enterprise. For example, if Company.com used enterprise service servers 103a to 103n to provide network-based application services for its customers and employees, employee "John Smith" at Company.com can use his user profile information stored in identity database 104n to obtain authentication credentials from the enterprise authentication appliance 102. After the user's client app on the mobile device acquires these credentials, typically in the form of storable token(s) or identities, the credentials are presented to the enterprise server providing the desired service, for example, 103a. The enterprise server verifies the credentials, for example by validating the credentials' signature or checking the provided credential against the enterprise identity database 104n. The enterprise can also use the enterprise identity database 104n, an application database 104a, or any other storage device, including local memory, to authorize the user. Once authorized, the user's device can begin to access the enterprise server's services.

Third parties can also provide network-based application services to client apps running on mobile devices. For example, third party service provider servers 105a to 105n may also accept an enterprise's credentials based on a trust relationship. A credential obtained for a specific enterprise from authentication appliance 102 can be used to access services at a service provider server 102a if that third party service provider trusts verified credentials from that enterprise. Third party enterprises can also use various data stores for additional authorization of users associated with a trusted enterprise's credentials. For example, database 106a can store authorization information on users from the trusted enterprise to determine whether a user is authorized to use a specific service, or feature within the service. Similarly, another embodiment could allow the service provider to directly access identity database 104n to determine this information.

Authentication Module

A client app may interact with the authentication and authorization process via an authentication module. An authentication module can be implemented with hardware or software, or an equivalent combination of the two. In some embodiments, the authentication module can be software integrated into the client app. For example, it can consist of native objective C code used by, or residing in, an iOS app, or java code for an Android app, or .NET code for a Windows mobile app, etc. The authentication module could also consist of managed code downloaded via an integrated web browser or other networking capability of a client app or mobile device.

The authentication module may store an authentication Uniform Resource Locator (URL) that it can use to direct a browser to access an authentication website. In some embodiments, the stored URL may be configurable by an administrator prior to download and installation of the client app, or configured after install through a typical client app or mobile device configuration interface. In addition, a separate stored URL may also be remotely configurable by receiving an authentication URL to be used via the network to communicate to the native app. An authentication module may also have multiple stored authentication URLs, where a different URL can be used depending on the network-based application resource to be accessed, or a characteristic of the user to be logged in (i.e. specific username, domain, or other attribute).

The authentication module can, among other things, search for stored authentication credentials, direct browsers to a stored authentication URL, communicate authentication credentials via a browser to the authentication appliance, and receive client app identities from the authentication appliance via a browser. This list is not exhaustive. More on the operation of the authentication module is described below by way of example.

Client App Authentication Example

Figure 2:
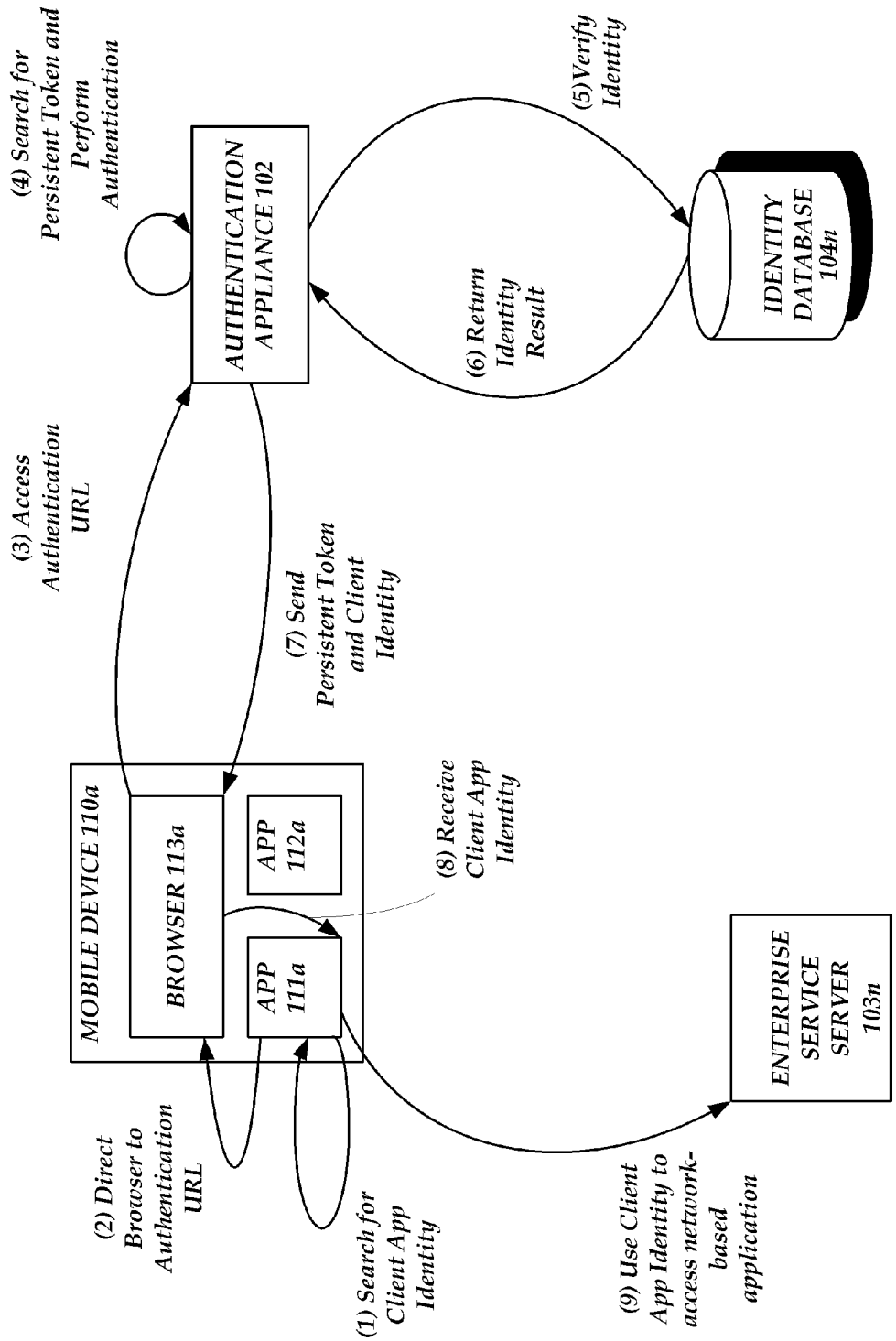
FIG. 2 is a block diagram of illustrative processes, communications and data flows between a mobile client device, client app, and server(s) used for identification, authentication, and authorization.

FIG. 2 is illustrative of example interactions between a client app, authentication appliance 102, and identity database 104n to allow a client app 111a to authenticate and gain access to a desired service provided by an enterprise 103n. Interactions between depicted devices may take place via a network such as the one depicted in FIG. 1.

After client app 111a has been downloaded and installed on a mobile device 110a, the client app 111a may be launched. The client app may immediately, or after a coded trigger, determine that it must access a network-based application provided by an enterprise server 103n. The application may alternatively decide to access a third party server, or any other service (or local process or protected feature) that is configured to accept authentication credentials obtained by the client app. When the client app prepares to access restricted network servers, the authentication module may be used.

Figure 6:
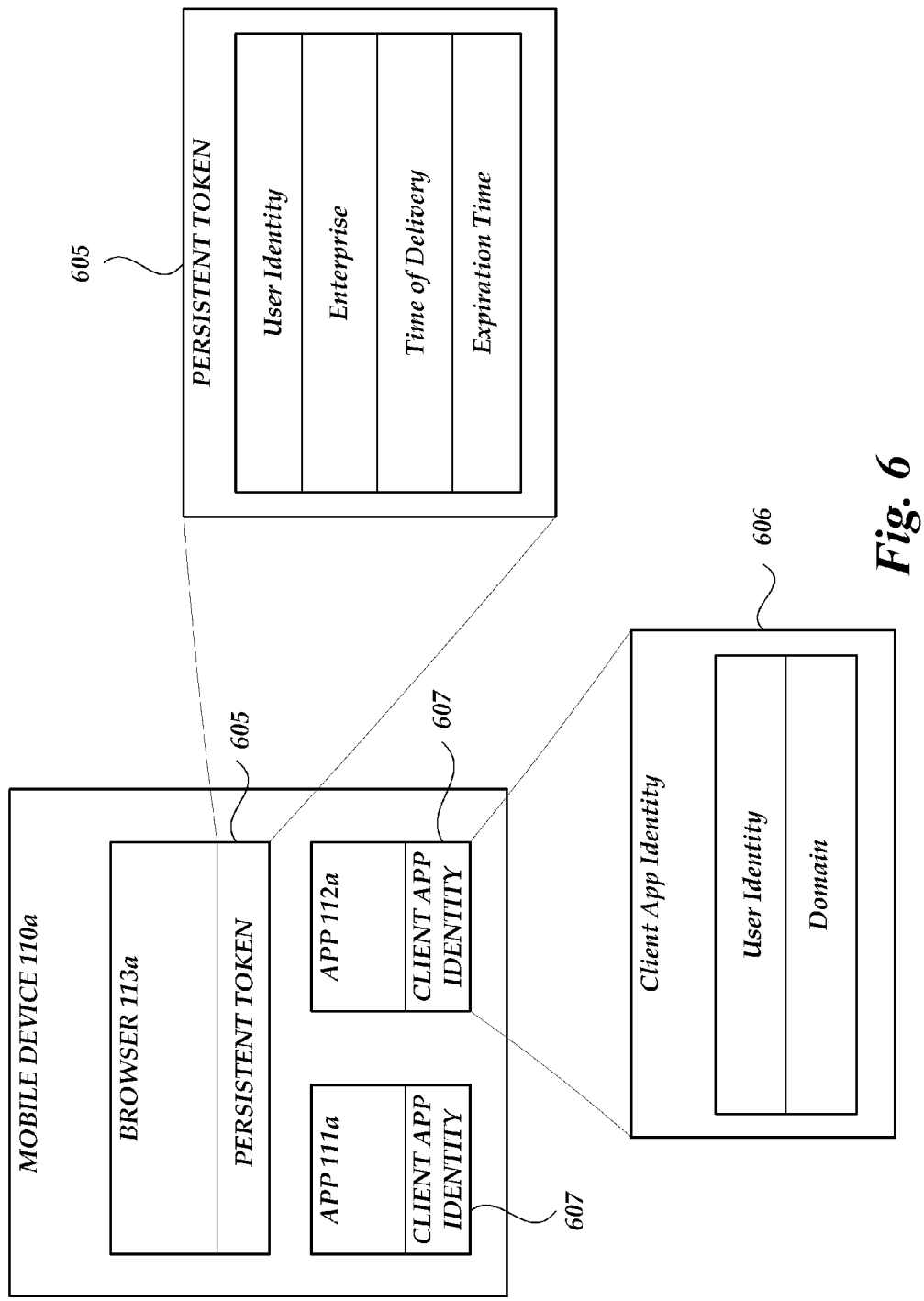
FIG. 6 illustrates one embodiment of data stored by the browser and client apps on a mobile device assist in authentication and authorization processes.

Before accessing the server, the authentication module may obtain authentication credentials to present to the server for access. Such credentials can be in the form of a client app identity 607, as depicted in FIG. 6. Such a client app identity 607 often comprises user identity information to identify the user to the server, such as a username and/or company/enterprise name, along with any other attributes that the particular server may require (name, email, authentication authority, groups, authorization info, etc.). A client app identity may also contain a cryptographic signature. As one skilled in the art would know, by using public/private key encryption such as PKI, one can nearly guarantee that the authentication appliance was the entity that issued the client app identity. This enables the server to trust that the client app identity presented by the client app was issued by the authentication appliance. This signature is not strictly necessary, and trust in the client app identity may be accomplished in other ways such as with a database lookup into the identity provider's database 104n by the server, or other such method known to those in the art to further verify the client app identity. A client app identity may comprise, by way of example, a userid in plain text or encrypted, a userid and a domain/organization (e.g. johndoe@company.com) in plain text or encrypted, a or an identity assertion in the form of SAML, OpenID, OpenID Connect, forms based authentication, lightweight third party authentication, an encrypted URL, encrypted HTTP headers or any another browser based form of identity. As described above, the client app identity may be determined by the appliance using a table and may vary from application to application.

Figure 5:
FIG. 5 is a block diagram of illustrative processes, communications and data flows between a mobile client device, a second client app, and server(s) used for a second authentication and authorization session.
Figure 5:
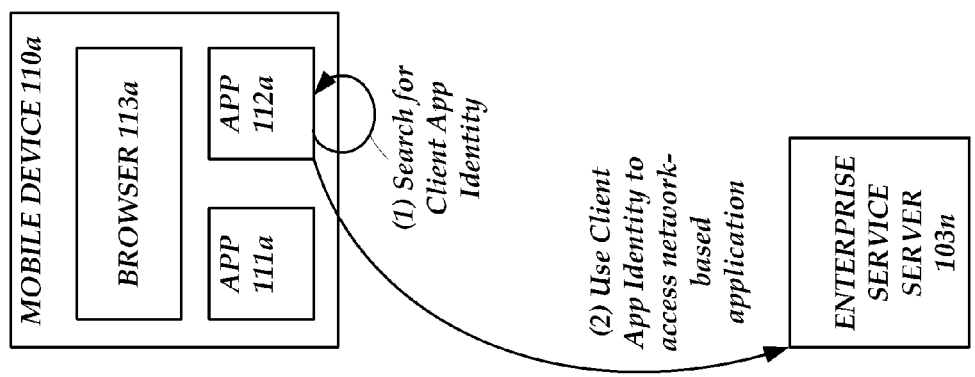

As shown in FIG. 2, the authentication module and/or client app may search for a previously stored client app identity. Well known search techniques may be used to find such identities based on a variety of criteria. Identities may be stored directly in memory, or in more complex data structures such as a relational database. The search may be accessing a known memory location that stores any identities that can be used with the client app, or as complex as searching a database based for a specific identity based on a specific user, credential domain, and/or network-based application resource to be accessed, among other characteristics. As shown in FIG. 5 for a second client app 112a, any client app, including client app 111a in FIG. 2, that has previously stored a client app identity may use the client app identity to provide credentials to a network-based application server. Alternatively, the client app identity may also be used to obtain further credentials, such as a SAML assertion, before accessing a network-based application resource. If the client app identity or further credentials are accepted by the network-based application server, the client app may begin a session with the network-based application server and access its resources without invoking the authentication process illustrated in FIG. 2.

If the authentication module proceeds with the authentication process instead of using a found client app identity, the authentication module can be configured to invoke either the mobile device's native, independent browser, or an integrated client app browser. The authentication module directs the browser to the specific stored authentication URL, corresponding to a URL of an authentication appliance 102. The browser performs an HTTP or HTTPS (or other specified protocol) request for the stored authentication URL. As a part of that request, a persistent token (or affiliated session token) 605, if already stored and accessible by the browser, may be sent that is affiliated with the URL or URL's domain. For example, a persistent token in the form of an HTML4 cookie and or HTML5 object will be sent to the URL when the URL matches the cookie's domain and path. If the token already exists—it may be from an authentication invoked by a separate client mobile app—or even native browser app. For example, the native, independent browser may have, as part of accessing a web service, already authenticated with the authentication appliance 102 and received a persistent or session token without any interaction with a mobile application/client app. In either instance some embodiments are able to validate the persistent or session token and enable users to access multiple webservers and/or mobile apps with a single-sign-on (SSO) if the browser-accessible persistent or session token is valid—signifying the user has previously authenticated successfully.

A persistent token may be in the form of a cookie as indicated above, but may also be in the form of a certificate or some other indication of identity and trust. In some embodiments, a session token may be affiliated with the persistent token, and may be used in lieu of a persistent token for a duration of a logon session. For example, once a persistent token is issued (as described below), a session token such as an HTML4 cookie and/or HTML5 object may be created by the authentication appliance and associated with the persistent token and the recent authentication.

Unlike the session token, the persistent token may persist across browser sessions. For example, a persistent token may be valid for three months, which may involve numerous browser sessions during that time. The persistent token may be used in lieu of reauthentication of the user each time a browser session is initiated. After verifying the persistent token, a session token (e.g. some temporarily unique identifier) may be issued by the authentication appliance to be used during the session to indicate that the user has recently authenticated and/or has a valid persistent token. As those in the art will recognized, in other embodiments, a session token need not be used, and the persistent token may act as a session token for all purposes. More information about the persistent token is disclosed below.

Once the URL is accessed, the server may parse the request for any persistent token received (or any affiliated session token). If a persistent token (or affiliated session token) is found, the authentication appliance 102 may perform token verification procedures illustrated in FIG. 3.

However, if the persistent token is not found, the authentication appliance 102 may communicate with the browser to perform a browser-based authentication. One example of such an authentication workflow is receiving from the browser 113a authentication information, such as a userid and password associated with a user, and verifying the userid and password combination with an enterprise's identity database 104n. This exchange between the browser and authentication appliance can occur over a secure channel, such as an SSL/TLS channel used in the HTTPS protocol. Other example authentication mechanisms, AAA features, authentication information, and workflows are depicted in US application publications with application Ser. Nos. 11/702,371, 12/075,219, 12/326,002, 12/392,760, 12/419,951, 12/948,037 and 13/035,289, the disclosure of which are hereby incorporated by reference. Authentication information that may be collected as a part of the authentication process can include, and is not limited to, data representing the user, the mobile device 110a, the client app directing the browser 111a, the server and/or services that client app is attempting to access 103n, and any knowledge known only to the user or mobile device that can assist in authentication.

In addition to username (also known as userid) and password type authentication, additional or alternative authentication mechanisms can be employed by the authentication appliance to enhance security. According to another aspect of the invention, a secondary identity credential may also be requested in addition to a password. There may be a secondary authentication system that utilizes an out-of-band communication channel that is separate from the network 101 and its related connections, to transmit an out-of-band security token to the user authenticating. This includes a one-time password that is sent via Short Message Service (SMS) or voice message over a telephone network. The generated on-time password may be communicated to the authentication appliance 102 for verification.

Instead of utilizing a time-limited token such as a one time password, there are other types of user-specific information that can be requested as a further basis for validation. One may be a static personal identification number (PIN) that is distinct from the password. Another is a knowledge based question seeking a knowledge based answer that, in theory, only the valid user or otherwise very intimate associate should know, such as the name of the user's first car, the name of the user's high school mascot, and so forth. Further, a digital certificate that is stored on the client app 111a, or a USB key attached to the mobile device, could also serve as a secondary identity credential. Multiple types and combinations of various identity credentials may be requested and verified, including, but not limited to, X.509v3 Certificates, SMS transmitted one-time-passwords, telephony transmitted one-time-passwords, static PINs, email transmitted one-time-passwords, USB tokens such as Yubikey, national x.509v3 certificate-based identity cards such as CAC/PIV, proximity cards such as an RFID or NFC, or any knowledge-based question or answer.

Once this authentication information has been collected, the authentication appliance 102 may use a variety of enterprise identity databases to verify a user or mobile device's identity. Such an identity database 104n can include, by way of example, SQL databases, Microsoft Active Directory servers, LDAP directories, Oracle ODBC servers, RADIUS servers, or any other on site or cloud database that stores user credentials or profiles. Each of these directories or authentication services can store information about the user or mobile device 110a being authenticated. Many of these databases also support authentication protocols.

One method for verification of a user via the data passed to the authentication appliance is to lookup the user's entry in the database, and compare the information submitted by the user to the information located within the database. If the submitted information and database resident information is identical or within select comparison parameters, then the user is considered to be who they claim to be and is considered verified. In this case, the FIG. 2 steps of "verify identity" and "return identity result" can comprise searching for a specific user or mobile device 110a in the database, receiving information about the user or mobile device 110a from the database, such as a complete user entry or specific attributes about the user or mobile device, and comparing the received data to the submitted information. Such interactions with the database may be over a secure channel, such as SSL/TLS or any other data privacy mechanism. If the comparison indicated that the user or mobile device 110a submitted information that only the user or mobile device 110a would know, then the user or mobile device is considered to be verified and authenticated.

Another method to authenticate a user is to perform an authentication exchange with the database. For example, LDAP directories, including Microsoft's Active Directory, support a variety of authentication mechanisms that can verify user passwords and credentials. Such an authentication exchange could be, by way of example, an, LDAP bind, or private/public key exchange. This method does not necessarily require transmission of the specific authentication information to the database. Instead, and as one skilled in the art would recognize, these methods may use encryption, nonces and hashes to determine whether the user or mobile device 110a has submitted the correct authentication information.

After the authentication process has been performed, the authentication appliance may authorize the user and/or client app to use the enterprise service server 103n, or a specific service or feature offered on the enterprise service server. For example, authentication for a specific server, service, or feature requested by the client app can be configured to be authorized by detecting specific attribute values associated with users. As a part of the authentication process, or separately, the authentication appliance can request user/mobile device specific data from the identity database, or another database affiliated with a specific server, service or feature, to make this decision. For example, the authentication appliance may determine whether a user's profile received from the identity database contains data indicating that the user is a member of a specific group authorized to use a service that the client app is attempting to access. Alternatively, instead of performing any comparisons of data itself, the authentication appliance may request from a different server or database than the identity database whether a specific user or mobile device 110a has access as desired by the client app 111a. In addition, as described elsewhere in reference to FIG. 4, the authentication appliance can accept the browser-based persistent token, translate that token to an identity already authenticated with the authentication appliance, and then check a policy or configuration that may trigger a step-up or stronger authentication of any type that is specified by the authentication appliance 102 or identity database 104n. This is advantageous because the user does not have to enter their identity multiple times because of the single-sign-on (SSO) capabilities provided by the browser-based persistent token provisioned by the authentication appliance.

After a successful authentication process, the authentication appliance 102 may create two tokens: a browser-accessible token (persistent, or session based, or both a persistent token and a session based token) 605, and a client app identity 607 (FIG. 6).

The persistent browser-accessible token is a data structure passed to a browser that stores user and authentication information used to validate a past login performed by the mobile device's browser 113a. A persistent browser-accessible token 605, referring to FIG. 6, may include a user identity (e.g. username, ID number or email address, etc.), the enterprise that the user is affiliated with (e.g. google.com, ibm.com, etc.), the time the token was created or delivered, and the expiration time of the token. Persistent browser-accessible tokens may also store the URL or domain name of the authentication appliance. Persistent browser-accessible tokens may be written to a variety of storage spaces controlled by the browser or its related processes, including: standard HTML4 browser cookie storage, HTML5 storage (e.g. HTML5 local storage, HTML5 session storage, HTML4 global storage, HTML5 SQLLight storage), Adobe Flash space, Android Dalvik storage space, J2ME managed code space, NET (smart client) code space, Native x.509v3 Certificate storage space, SDROM or any other storage space readable and writable by the browser 113a.

To create and initialize the persistent browser-accessible token, the authentication appliance may use authentication information sent to it by the browser 113a or information received from the identity database 104n about a user or mobile device 110a. For example, if a user successfully authenticated by sending a username and password, the username may be used as the user identity of the persistent browser-accessible token. In other embodiments, the user identity may be a user name or ID number sent to the authentication appliance 102 by the identify database 104n. Data can also be generated to be stored in the persistent token. For example, the time of delivery may be set to the current time when the token is created or sent to the browser. Additionally, based on configuration of the authentication appliance 102, or data or rules stored within the identity database 104n, the expiration time may be calculated. This may be performed by adding a configured allowed duration to the current time, and storing the calculated time in the persistent token.

As described above, in some embodiments, the authentication appliance may also create an affiliated session token (such as an HTML4 cookie and/or HTML5 object) that is associated with the current UserID and the persistent token. This token may only be valid for the current browser session. It allows the authentication appliance to merely check that a valid session is active instead of rechecking the persistent token each time access is requested for a new application, so long as the request occurs within the same browser session.

The client app identity is another data structure or text string that may be sent to the browser and communicated to the client app via a URL mapping mechanism that triggers the client app 111a on the mobile device 110a. A client app identity 607, as depicted in FIG. 6, may contain a user identity and a validation mechanism, as described previously. The client app may store and use the client app identity in a variety of ways, including but not limited to, sending and/or receiving the client app identity to obtain additional credentials, access network-based applications, or use user-specific local features. For example, if the client app needs to pass the client app identity to a server—the application can use a variety of methods to do so including REST calls, WebServices, APIs or other mechanisms. In some embodiments, the client app ID may be modified by the client app identity before use by the client app.

The tokens/identities, both the browser-accessible persistent token (and any session token) and the Client App identity, may be sent by the authentication appliance 102 to the browser 113a via the webserver-browser based communication. This can be accomplished by HTTP or HTTPS data transfer, or any other technique known in the art to transfer state information into a browser over a network. To enhance security, the data may be transferred to the browser using encryption. The browser then stores the persistent token into one of the browser-accessible token stores including: HTML4 persistent session tickets, HTML5 data storage (Local Storage, Session Storage, Global Storage, SQLLight Storage), X.509v3 certificate stores, Flash cookies, and/or others described above for future use. Browser 113a may also receive an instruction, described below, from the authentication appliance 102 to close the browser and/or return the focus of the mobile device's 110a user interface to the client app 111a.

In some embodiments, the client app identity may be transferred from the browser 113a to the authentication module within client app 111a using a variety of mechanisms.

In some embodiments, a URL is mapped on the mobile device and/or its browser to trigger the client app when that URL is accessed by the browser. This mapping can be registered within the browser and/or mobile device by the client app/authentication module upon startup of the client app/authentication module, upon download and/or install of the client app, or by other administration of the mobile device. For example, a client may launch and detect whether it has a registered URL mapping on the device. If not registered, it may register a mapping that triggers execution of the client app when the URL "ClientAppTrigger1" is called/accessed by the browser. The "ClientAppTrigger1" could have also been registered upon installation of the client app. When the client app requires a client app identity and invokes the browser to perform the authentication workflow with the authentication appliance, the authentication appliance may instruct the browser to call/access the URL "ClientAppTrigger1." Because the mapping of "ClientAppTrigger1" is registered with the mobile device and/or browser, instead of attempting to browse the URL, the client app is triggered instead and the browser is closed. Such mappings may also be stored within the authentication appliance.

When the native, independent browser is directed to a specific authentication URL, that authentication URL may be specifically formed to correspond to a client app, or may contain a query string parameter indicative of the client app. An HTTP header or cookie could also be used to identify authentication for a specific client app to the authentication appliance. Based on this identification (for example, using a URL such as http://auth.enteprise.com/authenticate/?clientapp=CLIENTAPP1), the authentication appliance may direct or redirect the browser to call or access the URL "ClientAppTrigger1" associated with the client app identified as "CLIENTAPP1".

Once the client app is triggered, the client app may receive the client app identity in numerous ways, including parsing it as a parameter from the accessed/called URL query string that triggers the client app (e.g. ClientAppTrigger1?identity=JohnDoe, etc.), or by accessing and reading the independent browser's storage of browser based headers and session information (e.g. accessing the browser's cookie storage). In either case, the query string parameter name or cookie/session name used for passing the client app identity may be known to both the authentication appliance and the client app to assist in identifying the client app identity data transferred. Thus, in the example above, the authentication appliance and the client app/authentication module should both know that the client app identity will be stored in the "identity" query parameter or name URL. Such naming conventions may be configurable within the client app/authentication module and the appliance.

However, browsers on mobile devices may be incapable of transferring a client app identity to a client app 111a running on the mobile device 110a. The authentication module need not receive the client app identity from the browser 113a. Instead, the client app identity may be sent directly to the client app 111a from the appliance 102 over other client-server mechanism (not shown in figures). This may be accomplished in a number of ways known to one in the art. For example, the authentication module within the client app 111a may allow for a webservice or REST API call directly to the authentication sever. In this regard tokens can be passed from the authentication server directly to the client app.

Regardless of how the client app identity is received, it may be received in plain text or encrypted. If encrypted, the client app (or any network-based application resource) may use a web service call or other mechanism to decrypt the client app identity. The plain text client app identity may then be sent from the authentication appliance to the client app/authentication module. Other embodiments could decrypt the encrypted client app identity using symmetric or private/public key encryption/decryption performed locally on the mobile device.

Once the client app 111a has received the client app identity, the client app 111a may send the identity to the enterprise service server 103n, obtain further authentication or authorization tokens/credentials using the identity, use any local feature or network service that accepts/uses the client app identity. The enterprise service server 103n may analyze the identity, determine and store the user or mobile device the token belongs to internally, and verify its authenticity. Verification may involve, but is not limited to, validating a cryptographic signature contained within the client app identity, or performing a local or remote database lookup, such as identity database 104n. The enterprise service server 103n, in addition to accepting the identity as authentication of a user or mobile device 110a associated with the client app, may also independently authorize the user or mobile device to use the enterprise service server.

It should be noted that, once the independent browser has stored the persistent token and/or the session token), the user may also access various websites, web servers, or web services without additional authentication. The independent browser may use the persistent token to automatically achieve single-sign-on capability via identity recognition of the identity in the browser-based persistent token. This SSO capability is performed by the authentication server as described in this patent.

Client App Re-Authentication Example

A client app may be used by a user more than once. For example, a user may use a client app to access a particular local feature or network-based application service and be required to authenticate using the authentication process described above. A user may then use the same client app again and attempt to access the same or similar local feature or network-based application service.

Figure 3:
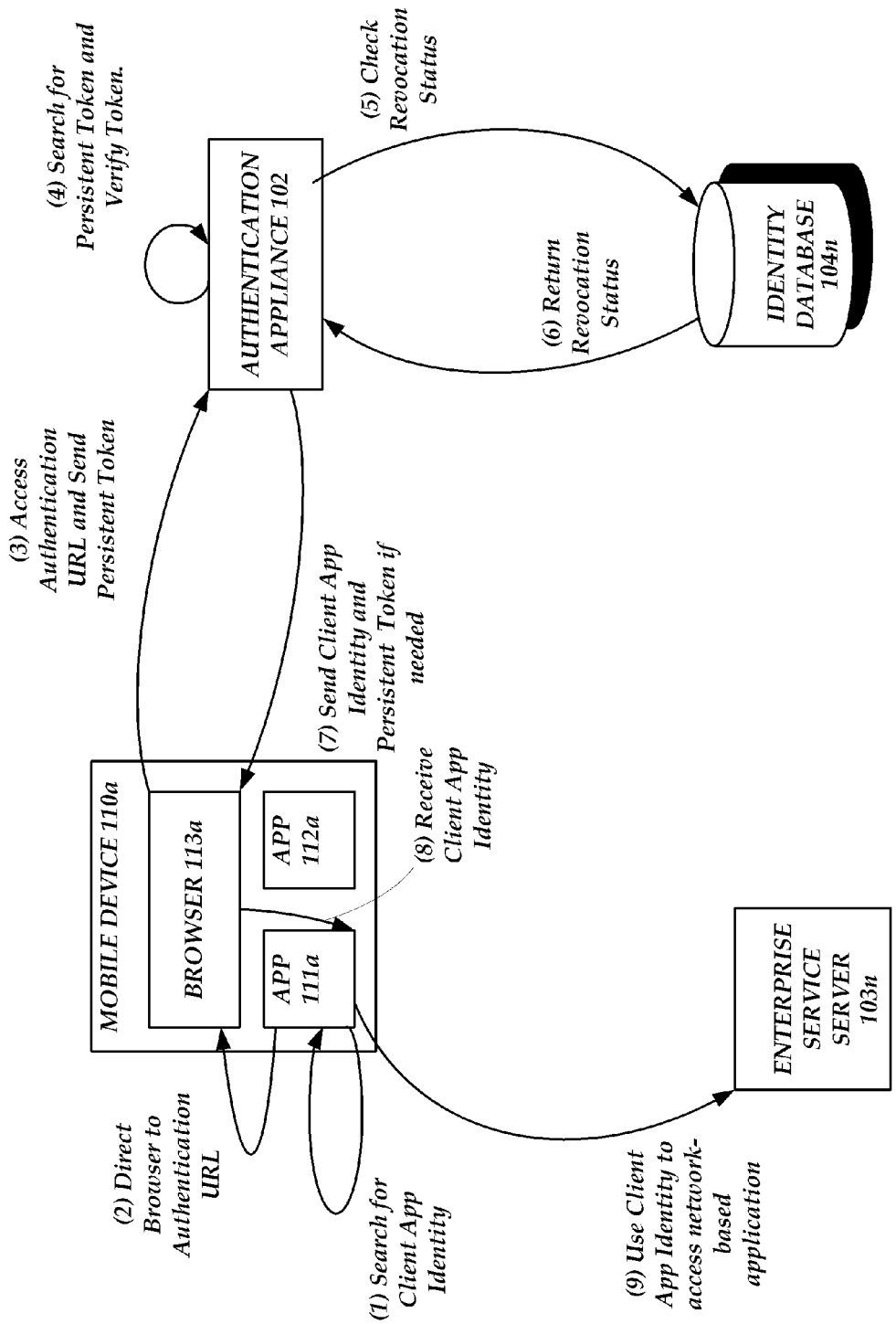
FIG. 3 is a block diagram of illustrative processes, communications and data flows between a mobile client device, a client app, and server(s) used for a second authentication and authorization session.

FIG. 3 illustrates an example authentication process that may take place after client app 111a has previously authenticated and received a client app identity for the desired network-based application service from the authentication appliance 102. For the second use of the client app 111a, the same basic authentication process described above may be performed. However, because the client app 111a previously authenticated, the authentication process may perform a slightly different process.

Initially, when the client app 111a is initialized or attempting to gain access to a network-based application, the authentication module will search for a client app identity. Because client app 111a had previously authenticated, such a client app identity may be found. The client app identity may be inspected to determine when the stored identity found by the authentication module is useable to access the desired network-based application, such as enterprise service server 103n. This determination may be based on a single or combination of factors, including whether the current user may use the client app identity from the previous session, whether the client app identity is time limited, whether the client app identity is for the same service, whether the client app identity can be validated, etc. If found to be useable, the client app 111a may immediately send or use the client app identity to the service to gain access. A similar process for client app 112a is depicted in FIG. 5. If not found to be useable, the client app may repeat the authentication process as depicted in FIG. 2, or determine whether the repeat user's authentication credentials or authorization has been revoked.

In some embodiments, the client app 111a, regardless of whether a client app identity is found or searched for, may require checking whether a repeat user's authentication credentials or authorization to the desired network-based application service has been revoked since the initial authentication process illustrated in FIG. 2. For this reason, or other reasons, the client app's 111a authentication module may be configured to always direct the browser 113a to the authentication URL whenever authentication is required.

As described in the previous section, the browser 113a will access the authentication appliance by accessing the passed URL. As a part of accessing the authentication URL, the browser may pass the HTML4 session cookie or HTML5 session object and/or the stored persistent token to the authentication appliance, either automatically or by request. Whether to send the persistent token to the authentication appliance may be determined by the browser comparing the URL to the URL and/or domains associated with the persistent token. If a match or partial match is found, the browser 113a may send that persistent token to the authentication appliance 102. In the alternative, if the browser has a session token stored that is associated with the persistent token, only the session token need be passed to the authentication appliance.

The authentication appliance 102a may search for a persistent token or session token sent by the browser 113a. If a persistent or session token is found, the authentication appliance may validate and verify the token. Such validation and verification may entail performing cryptographic validation of a signature that is included with the persistent token or verifying that the information stored within the token is consistent with an associated identity database 104n, or attributes stored about previous authentications in a local database. This validation and verification may also include determining whether a user's authentication rights or authorization for a particular application has been revoked. These rights may be determined by consulting revocation related users attributes within an identity database 104n, such as a max credential count or credential validity start and end times. These values may be configurable by an administrator, such as the administrator of the enterprise service, authentication appliance 102, or identity database 104n. Such a determination may also be performed as described in US application publication with application Ser. No. 12/419,951, incorporated by reference herein in its entirety.

If validation and verification is successful, the authentication appliance 102 may generate a new client app identity that will be sent to the client app 111a which can be used to gain access to the desired enterprise service server 103n as described for FIG. 2. Alternatively, if the authentication appliance 102 cannot verify or validate the persistent token and session token, then it may require browser 113a and its user to re-authenticate (or send a valid persistent token if a session toke is invalid), which may involve receiving one or more usernames and passwords and/or other authentication information, as described in FIG. 2.

Second Client App Authentication Example

Figure 4:
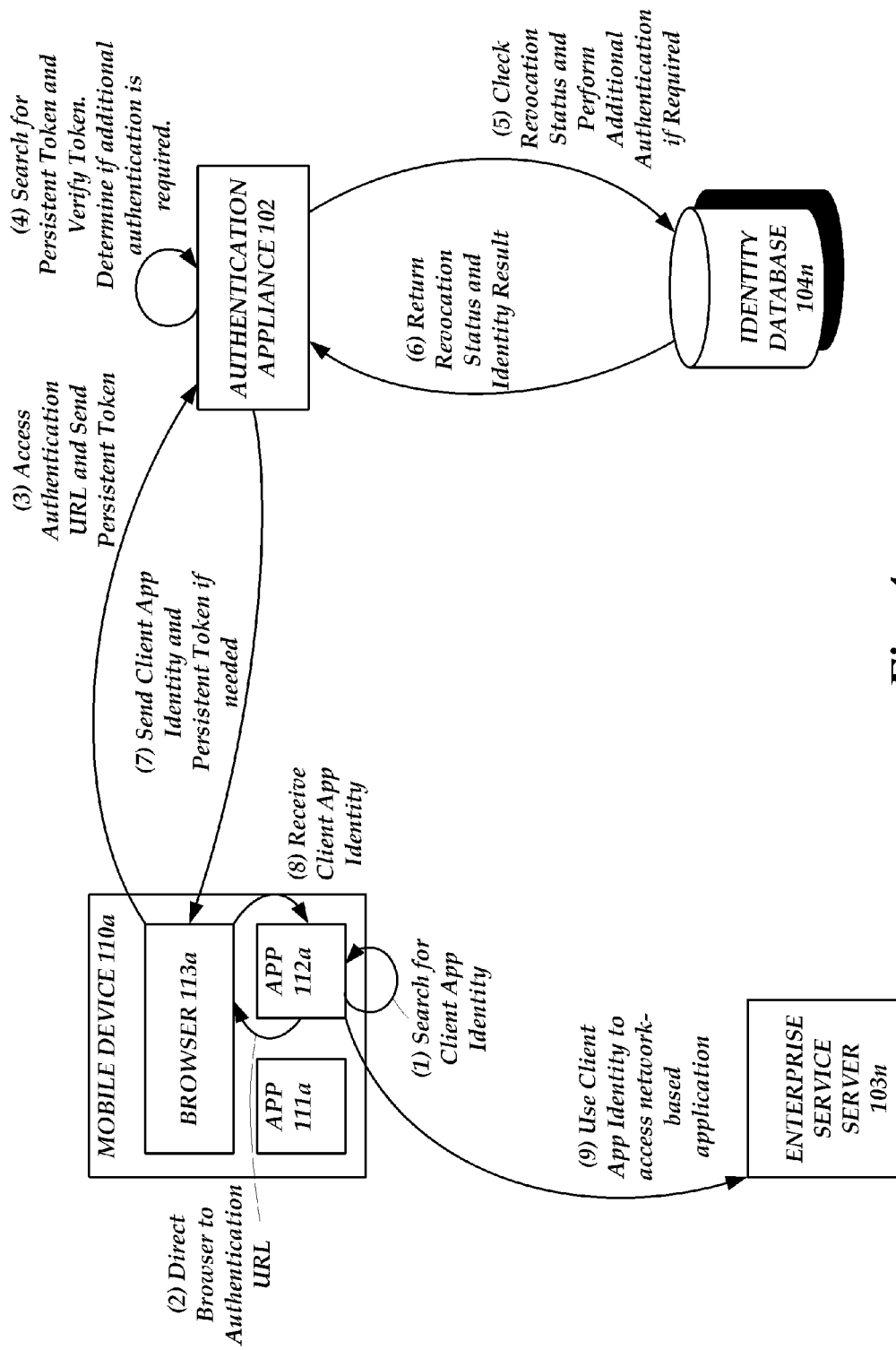
FIG. 4 is a block diagram of illustrative processes, communications and data flows between a mobile client device, a second client app, and server(s) used for authentication and authorization.

Referring to FIG. 4, in this example scenario, client app 111a has already authenticated using the authentication appliance. A client app identity is stored within client app 111a, and a persistent token is stored within browser 113a. A second client app 112a downloaded and installed on mobile device 110a may also seek to use the same or a different enterprise service server 103n as client app 111a. Assuming client app 111a and client app 112a use the same or related authentication URL (e.g. the same or domain related authentication appliance for authentication), the second client app's 112a authentication process can be shortened by using the persistent token stored within browser 113a.

In general, the second application may attempt to authenticate and obtain access to the network-based application in the same manner as the first client app, as exemplified in FIG. 2. The authentication appliance 102a may search for a persistent browser-accessible token sent by the browser 113a. As described above in FIG. 3, if found, the authentication appliance may validate and verify the token (or an associated session token if sent). Such validation and verification may entail performing cryptographic validation of a signature that is included with the persistent token or verifying that the information stored within the token is consistent with an associated identity database 104n, or attributes stored about previous authentications in a local database. This validation and verification may also include determining whether a user's authentication rights or authorization for a particular application has been revoked. These rights may be determined by consulting revocation related users attributes within an identity database 104n, such as a max credential count or credential validity start and end times. In addition, traditional certificate based revocation systems like OCSPs or CRLs may be utilized. These values may be configurable by an administrator, such as the administrator of the enterprise service, authentication appliance 102, or identity database 104n. Such a determination may also be performed as described in US patent application publication with application Ser. No. 12/419,951, incorporated by reference herein in its entirety.

As a part of the persistent token's verification or validation, the authentication appliance 102 may require additional authentication to be performed of the user, second client app 112a and/or mobile device 110a. The authentication appliance may determine that the particular network-based application that the second client app is attempting to access requires multiple types of authentication, or stronger authentication than previously performed, to enhance security. This determination can be made independently depending on configuration of policies on the authentication appliance 102, or in consultation with the identity database's 104n configuration or policies. For example, the identity database 104n may store attributes associated with a particular user, mobile device 110a, client app 112a, or enterprise service, that indicates a higher level, or multi-factor, authentication as required. Such a configuration may require the user to provide additional authentication information. Additional authentication may also be performed consistent with US application publication with application Ser. No. 12/948,037, already incorporated by reference herein in its entirety. An example of performing additional authentication would be, in addition to previously collecting username (userid) and password, the authentication appliance also collected a portion of an SMS message, a knowledge based question/answer, a static pin, or a USB key. The collected data can then be compared by the authentication appliance 102 to information within a local database or the identity database 104n to determine authenticity.

If the additional authentication is successful, the authentication appliance may generate a new browser-accessible persistent token to be sent and stored within the browser 113, where the new persistent token indicates that the user, mobile device 110a, or client app 112a has undergone multiple types or a stronger type of authentication. Alternatively, or in combination, the authentication appliance may store information about the old or newly generated persistent token that indicates the bearer of that token has authenticated using multiple factors or at a certain level strength. This information may be stored in the identity database 104n, or locally within the authentication appliance 102. For example, the number of authentications, types of authentications, and/or strengths of authentications associated with a persistent token may be stored in a user profile in the identity database 104n that corresponds to the user of app 112a.

Similarly, the authentication appliance may generate a new client app identity to be sent and received by the second client app 112a, where the new client app identity may indicate that the user, mobile device 110a, or client app 112a has undergone multiple types or a stronger type of authentication. Alternatively, or in combination, the authentication appliance may store information about the client app identity that indicates the bearer of that token has authenticated using multiple factors or at a certain level strength. This information may be stored in the identity database 104n, or locally within the authentication appliance 102. For example, the number of authentications, types of authentications, and/or strengths of authentications associated with a client app identity may be stored in a user profile in the identity database 104n that corresponds to the user of app 112a.

If additional authentication is not needed, persistent browser-accessible tokens and client app identities may be generated and sent as normal to the browser and client app 112a respectively. Such tokens, including the tokens discussed in FIG. 2 above, may contain data representing the authentication level of previous authentications. In some embodiments, the browser would continue to use the same persistent token when no additional authentication is required, and a new persistent token would not be generated.

As one skilled in the art would recognize, some embodiments could track authentication level in either the client app identity, persistent token, or within the authentication appliance 102 or identity database 104n as described above Once the client app identity is obtained by client app 112a, the client app 112a may use the token to obtain additional authentication or authorization credentials, gain access to an enterprise service server 103n, access local features contingent on the identity, etc.

Second Client App Re-Authentication Example

Referring to FIG. 5, in this exemplary scenario, like in FIG. 4, the client app 111a has already authenticated using the authentication appliance. A client app identity is stored within client app 111a, and a persistent browser-accessible token is stored within browser 113a. A second client app 112a downloaded and installed on mobile device 110a has also already authenticated and has received and stored a client app identity acceptable by the enterprise service server 103n.

When the second client app 112a is again initiated by the user, and prior to client app 112a accessing the enterprise service server for a second time, it searches for and determines whether or not a client app identity to access the desired enterprise service is already stored locally. If found, client app 112a presents the client app identity to the enterprise service server. If accepted by the enterprise service server 103n, the client app 112a may now access the service. Reasons for rejecting the token could include, by way of example, that the token is too old, or the token cannot be cryptographically validated. In this manner, within a limited time, no re-authentication is required by the user or browser. Instead, the user simply launches the app 112a and accesses the service without interruption because the user had recently already authenticated using the browser. In some embodiments, the second client app could always determine whether the client app identity has been revoked, as described for a first client app in FIG. 3.

In this case, the mobile app may choose to invoke the native browser and direct the browser to the webserver as detailed in this patent application, for example, as depicted in FIG. 3. The webserver will then retrieve and inspect the browser-accessible session token and possibly the persistent token (if a session token is unavailable, or otherwise instructed to reexamine the persistent token) and re-evaluate attributes associated with the tokens and related userid, such as: Time/Expiration, whether the identity exists in the identity datastore such as 104n, group permissions, access rights, etc.

If all are acceptable the authentication server via the mechanisms described herein will send back to the client app a client app identity to be utilized in the client app's processes.

Other Client Application Flowcharts

Figure 7:
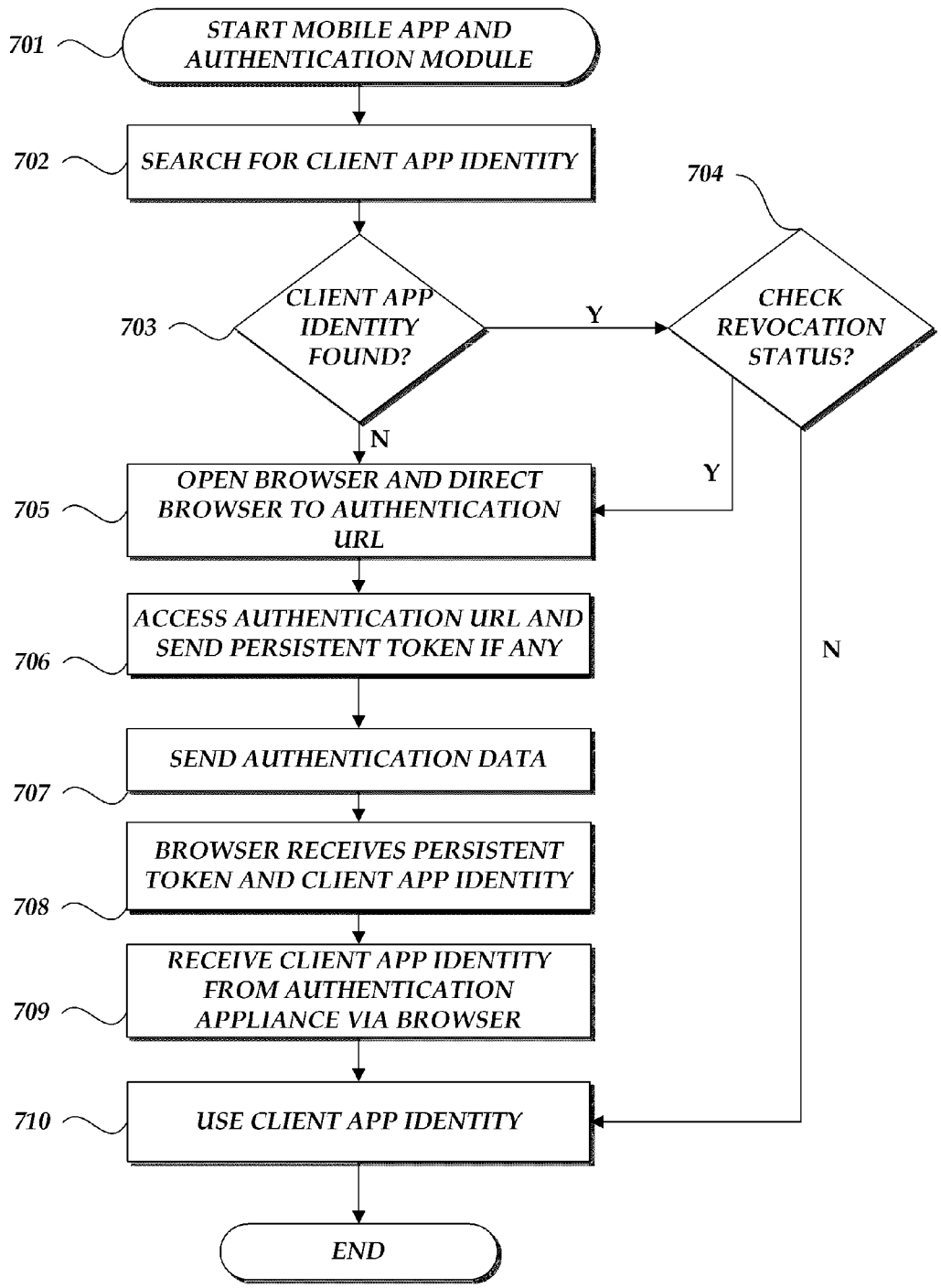
FIG. 7 is a flow diagram of an illustrative process for a mobile device to authenticate a first client app to access a restricted server.
Figure 8:
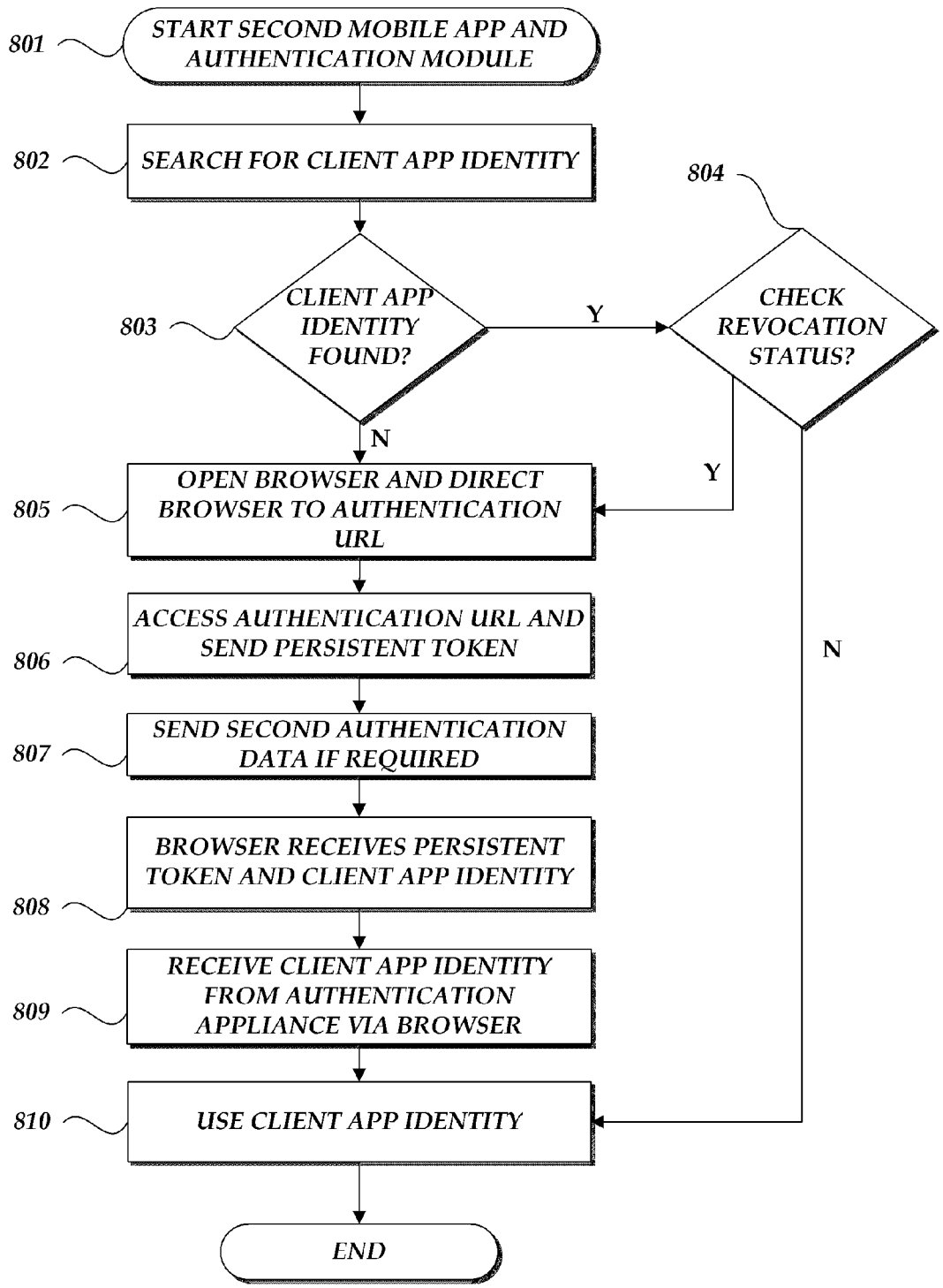
FIG. 8 is a flow diagram of an illustrative process for a mobile device to authenticate a second client app to access a restricted server.

FIG. 7 and FIG. 8 are related flowcharts of exemplary embodiments of actions taken by the authentication module and native, independent browser on a mobile device.

FIG. 7 represents an authentication process for a first launched mobile device application (i.e. client app). After the client app is started, the authentication module will search for a client app identity 702 that represents previous authentications. If found 703, the authentication module may determine whether it is configured to always check the revocation status of the client app identity 704. If checking the revocation status is not required, the client app identity may be sent to a server 710 to gain access to the desired network service for the client app.

However, if revocation status is to be checked, or if no client app identity is found, the process may continue to block 705. In that block 705, the authentication module may direct the native, independent browser on the mobile device to access the authentication URL on the authentication appliance. As describe above, the URL may include parameters indicating the specific application to be authenticated, the level of authentication required, an identifier to relate the browser to the client app used by the authentication appliance to determine browser/client app pairs, etc. These parameters may also be passed within the HTTP headers, or by other means, instead of within the URL string.

In block 706, when accessing the URL, the browser may send any persistent browser-accessible token that is already stored (and/or a session token) and affiliated with that authentication URL or authentication appliance. The persistent token (and/or session token) can be used by the authentication appliance in determining whether any additional authentication, or re-authentication is required.

If authentication is required, in block 707, the browser may send all authentication data inputted by the user or affiliated with the user which could include, by way of example, a username and password, a static PIN, a certificate registered to the user, a knowledge based answer, etc. If the authentication appliance is satisfied, the browser will receive a persistent token (and/or a session token) described above from the authentication appliance. In block 708, and the authentication module will receive a client app identity in block 709, which can be accomplished, as described above, by using a URL mapping mechanism on the client device to trigger the client app/authentication module's parsing of the URL query string or reading the browser's session storage for a cookie. The browser may close, and, in block 710, the authentication module can use the client app identity to the server for access, or use the identity for any other purpose, including allowing access to a feature locally available on the mobile device or obtain further authentication credentials using other means.

FIG. 8, which describes a sample second client app's authentication process, illustrates that, in block 807, a second level of authentication may be required for certain applications. As described above, a network service may require a higher level of authentication than was performed for a previous client app or network service. Thus, additional authentication may be sent by the browser and verified by the authentication appliance before a client app identity for the current client app is received by the authentication module.

Logout

In some embodiments, logout functionality may log a mobile app off the enterprise service or resource being used. The logout may occur by the mobile app transmitting messages to the enterprise service indicating that logout is desired.

However, in a multiple application SSO environment, a user may be logged into multiple applications at the same time. Thus, when a user logs out of one network resource within a client app, other applications may still be logged in, even if the user believes he is now logged off all applications. The persistent token and session token may still be resident in the browser and other applications may use that credential to login to other apps despite the user believing that he is now "logged out". A malicious user in possession of another person's mobile device could possibly now gain access to sensitive client apps or network resources by using the persistent token, despite the user believing he or she logged off. Another disadvantage of a single logout system is that, even if the user was aware that he or she is not logged out of all applications, it would be inconvenient for a user to be forced to logoff all applications one at a time.

Therefore the user may desire to logout from all applications at the same time. Alternatively or in combination, an administrator of the related applications, authentication appliance, and/or the network resources being accessed may require logout (i.e. through a set policy) from all applications at the same time in order to reduce idle logins and increase security.

In some embodiments, the disclosed systems and method below solve this problem by allowing a user to log out from all applications, informing the authentication service that a logout has occurred, and preventing other mobile applications from logging in via the persistent token(s) stored in the browser. This type of embodiment may require mobile applications attempting to login in the future to re-authenticate with the authentication appliance via the browser as described above before accessing an enterprise service or resource. In some embodiments, once an application has logged out, it may log other applications out of their respective services as well in a global logout operation. Such a global logout may be accomplished by either registering each active application locally or on the authentication appliance, or, in other embodiments, by iteratively calling other mobile applications via a predetermined sequence of accessible URLs registered within the mobile device.

Mobile applications may implement logout functionality that may be triggered either automatically by the application (e.g. after a timeout), or via user interaction. When a mobile app's configured scheduled logout occurs or when a user indicates a logout is to occur, in some embodiments, the application may transmit a logout message to the enterprise service to indicate the user is logging out. For example, one such message may comprise an HTTP web service call (or comprise an message in any other protocol) that indicates to the enterprise service that the mobile application should no longer be considered logged in, and no longer should have access to the service or resource. The logout may occur whether or not the enterprise server or service responds to the mobile application. If it does respond, it may include an instruction to the mobile app to delete the client app identity and/or domain associated with the user authentication/login 606.

Figure 9:
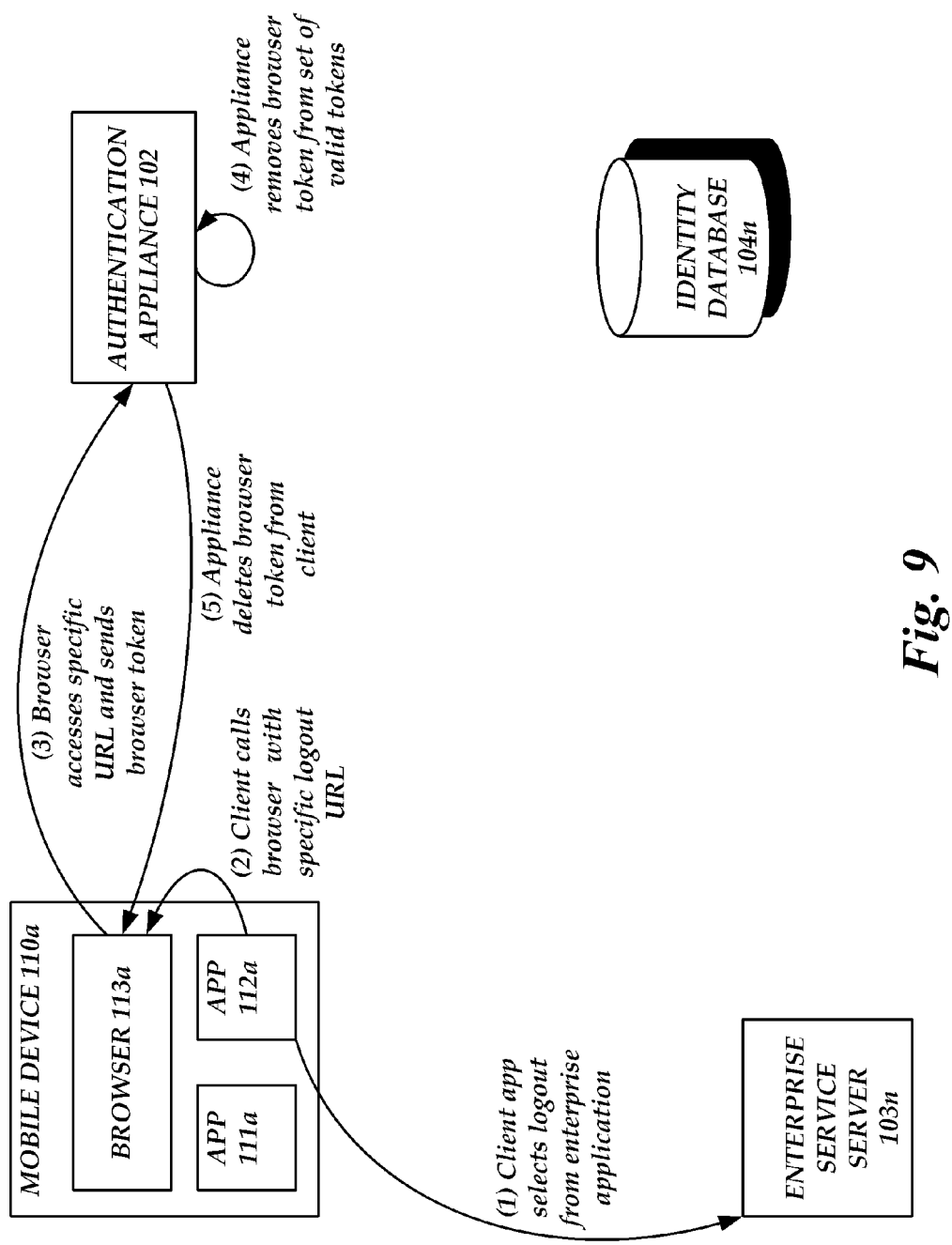
FIG. 9 is a flow diagram of an illustrative process for a mobile device to logout from access to a restricted server.

In some embodiments, such as one illustrated in FIG. 9, the mobile application may proceed to inform the authentication appliance about the logout. As described previously, in FIG. 9, the client app begins by a user selecting to logout (or automatically logout) from the enterprise service (1). Like above, the enterprise service may or may not respond with additional messages to the mobile application.

In some embodiments, the mobile app may additionally communicate with the authentication appliance to instruct the appliance/service to logout from the applicant/service, and prevent any future use of the authentication credentials without re-verification (e.g. destroying the session token and requiring a persistent token to be reverified). In some embodiments, this may be accomplished by calling the mobile device's browser and (2) directing the browser 113a to a specific logout URL associated with the authentication appliance. This URL may be already known to the mobile app 112a, or have been received from the enterprise service server 103n or the authentication appliance 102 as part of the logon process (or any other configuration process) and stored within the mobile application (in some embodiments, within its authentication module). The browser may then access the specific URL requesting the logout operation and send the user browser (session or persistent) token to the authentication appliance to identify which user is requesting a logout. Alternatively, the specific URL may already be associated with the specific identity requesting logout. For example, upon login, a specific logout URL may be created or accessed by the authentication appliance/service and transmitted to the browser (and in some embodiments forwarded to the mobile app). This logout URL may then be accessed when logout is desired. Such a logout URL may indicate the party logging off in various portions of the URL, for example in the HTTP get parameters, POST parameters (e.g. sending the persistent token as a cookie), or in the main URL itself. In some embodiments, the logout URL may also indicate and be associated with the mobile application directing the browser to access the logout URL (for example, using a URL such as http://auth.enteprise.com/logout/?clientapp=CLIENTAPP1).

The application may then (4) remove the persistent token (e.g. a browser token that may be a session token or persistent) and/or any identity associated with the persistent token, from a set of valid tokens and/or valid identities. This logs out the user from access to mobile applications not currently logged in to an enterprise service. Any mobile application that requires use of a browser token (session or persistent, depending on the embodiment) for the login/authentication procedure discussed herein are now unable to use the browser token stored within the browser because sending that browser token to the authentication appliance will no longer result in receiving back a client app identity suitable for use with the enterprise service/server 103n. The authentication appliance will be unable to lookup any associated client identity with the browser token because it has been deleted, unassociated, or restricted its use with any mobile application or client app identity. At this stage, the appliance may also write to a database or file (e.g. a log) that a particular user has logged out, which may include a date/time, a mobile device identifier, a browser identifier, the client app identity, and/or the mobile app associated with the logout request.

The appliance may then transmit, and the mobile device and browser may receive, an instruction from the authentication appliance to remove the browser token from the mobile device's browser (5). For example, if the browser token is in the form of an HTTP cookie, then the cookie may be deleted by informing the browser to expire the cookie (e.g. via a Set-Cookie command that sets the cookie's expiration date to a past or present time, or setting the maximum time value to 0 or a limited duration). Other methods may be used by the authentication appliance to instruct the browser to destroy or render unusable the persistent token.

Because the browser token has been removed and/or rendered unusable, all applications seeking authentication through the appliance through the mobile single sign on type system must re-authenticate to gain access to an enterprise server or service. In other words, the browser token no longer represents a valid authentication session, and the user/client app identity is logged out.

Figure 10:
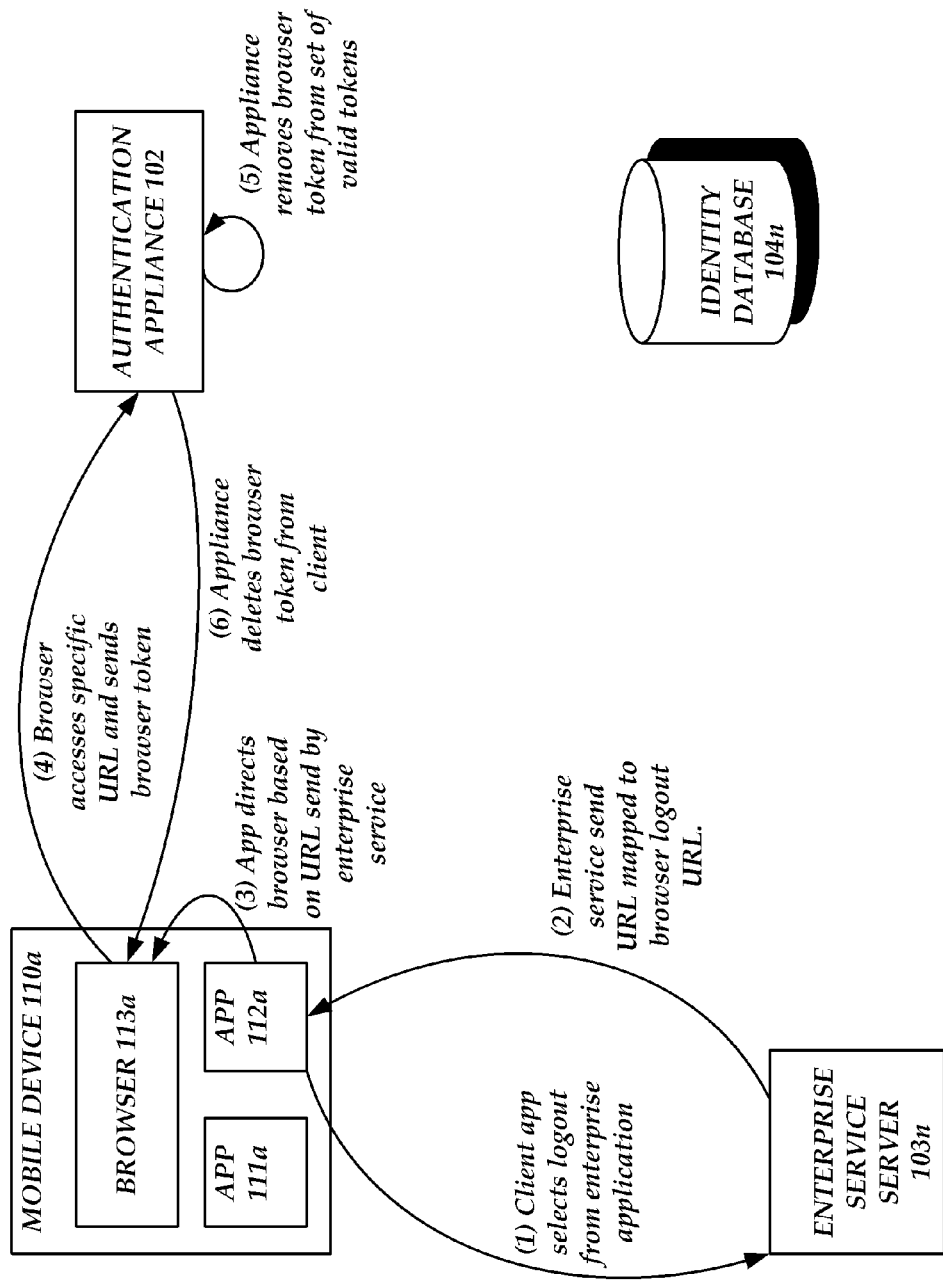
FIG. 10 is a flow diagram of an illustrative process for a mobile device to logout from access to a restricted server.

FIG. 10 illustrates other related embodiments of the logout functionality. In FIG. 10, mobile application 112a does not initiate communication with the appliance to remove the browser token's association with a valid client app identity in the single sign on system. Instead, after a user decides to logout (or otherwise end their session with the enterprise service/server) (1), the enterprise service may force app 112a to delete the browser token and logout a user from the web single sign on system. This may be accomplished by (2) sending a URL to the client app 112a to use to direct the browser to in order to logout. One of the advantages of these types of embodiments is that it is the enterprise service or resource that has control over when the global logout occurs and the client app need not store ahead of time the logout URL. As in other embodiments, once the client app has received the URL to complete the logout process, the app may direct the browser to the received URL, and the logout process continues as discussed previously with FIG. 9.

Figure 11:
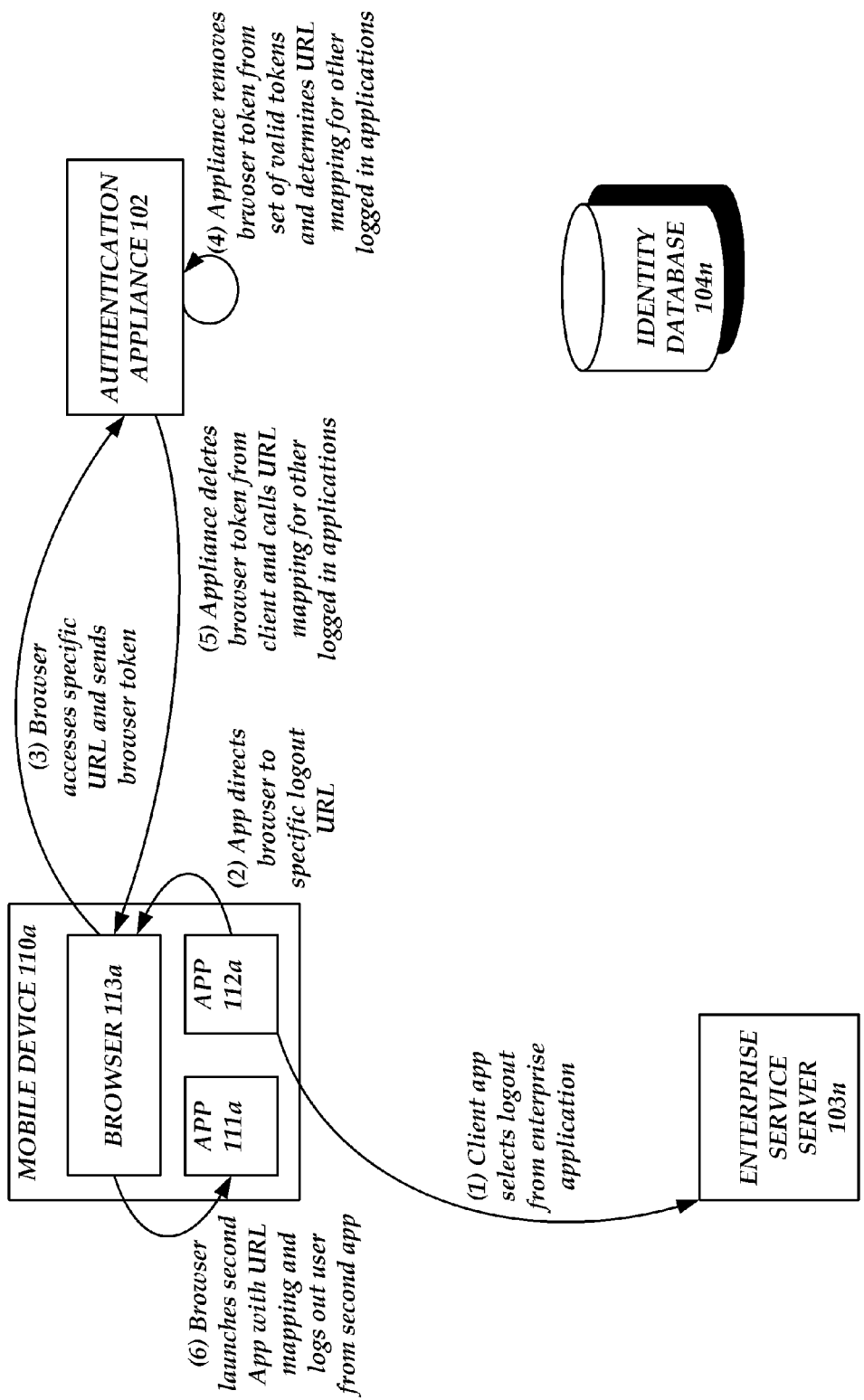
FIG. 11 is a flow diagram of an illustrative process for a mobile device to logout one or more applications from access to a restricted server.

FIG. 11 illustrates how some embodiments may force the logout of client apps that are not involved in the logout processes described above. As discussed previously, an application may inform an enterprise service server 103n that it is logging out of a network service (1). Before or after contacting the network service, the app may direct browser 113*a* to access a specific URL (2) associated with the authentication appliance to logout and destroy the browser's token (or, as discussed under FIG. 10, the enterprise server may instruct the client app 112*a* to access the specific URL). The browser may then access the specific URL (or web service, or whichever protocol is used to communicate with the authentication appliance). When the browser is accessing the specific URL, the browser will send (3) the browser token to the authentication appliance 102. Once the authentication appliance has knowledge of the browser token, the appliance may remove the browser token from its set of valid tokens associated for mobile device 110*a* and/or browser 113*a*. For example, it may remove a database entry that associates a persistent token's ID to the mobile device 110*a*, or the specific browser 113*a*.

Stored on the authentication appliance may be a list of one or more applications, such as client app 111*a*, that have used the same persistent token to receive a client app identity and logon to a network service. A URL mapping may be associated with each client application. Such mappings may be the result of permanent associations learned through a manual or automatic configuration of authentication appliance, or may be transmitted to the authentication appliance from each client app or the browser upon authentication or when a client app ID is issued.

As discussed previously, the appliance then responds to the browser with an instruction to destroy or render useless the browser session token (5) (and in some embodiments, optionally, the persistent token). In addition, in some embodiments, the authentication appliance may also instruct the browser to redirect to the URL mapping associated with a client app, such as client app 111*a*. Such a mapping may trigger execution of the client app when, for example, the URL "ClientAppTrigger1" is called/accessed by the browser when redirected by the authentication appliance. Because the mapping of "ClientAppTrigger1" was registered as associated with client app 111*a* on the mobile device, instead of attempting to browse the URL, client app 111*a* is triggered instead.

Once the client app is triggered (6), the client app may automatically logout of any enterprise service server or network resource it was accessing. This may involve destroying the client app identity associated with the client app 111*a* on the mobile device and/or sending a message to its affiliated enterprise service server to instruct the server or network resource that it has logged out and its session is over. Advantageously, as one skilled in the art would recognize, this allows a logout command that originated with client app 112*a* to also logout client app 111*a*. Additionally, in some embodiments, client app 111*a* may direct the browser back to the authentication appliance to query the appliance for more URL mappings that may be used to log out additional applications.

Figure 12:
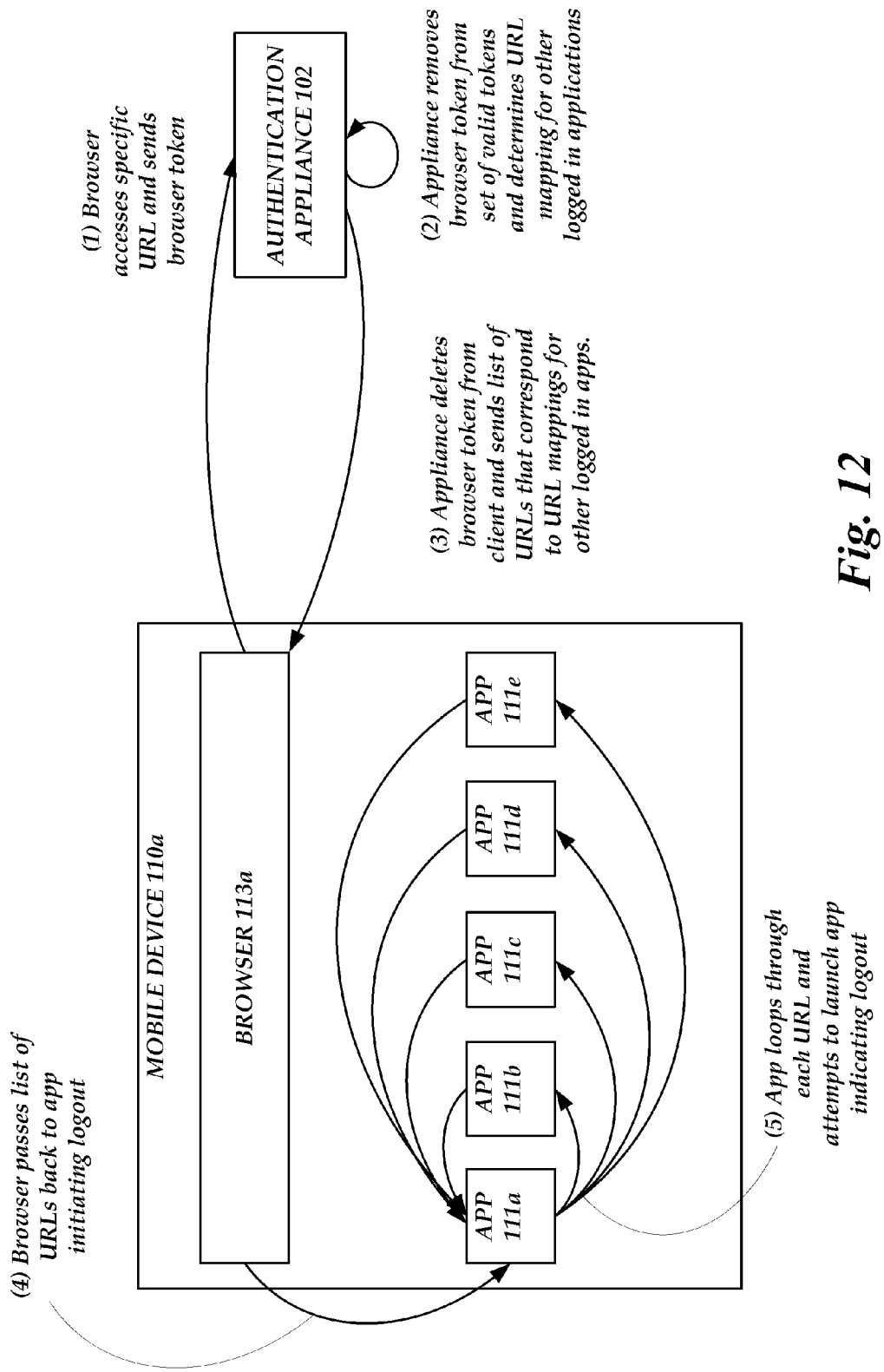
FIG. 12 is a flow diagram of an illustrative process for logging out multiple applications.

In some embodiments, as described in FIG. 12, the browser (and subsequently the client app) may receive a list of applications from the authentication appliance that should be logged out. The authentication appliance may track the applications that a user is logged into based on the client app identities it has sent to the user device's browser. As shown in FIG. 12, the authentication appliance, after it receives a logout request, may determine the list of URL mappings for other logged in applications (2) (or alternatively, the list of applications if the client app already knows the mappings). This list may then be transferred to the browser 113*a* (3), and passed on to the client app 111*a* (4). The list may then be utilized to call the native client app URL to start a chain of calling each mobile app for the purpose of logging out of each mobile app. Each app would then call back the first mobile application 111*a* because the first mobile application tracks which apps have been logged out, and which apps are remaining to be called. App 111*a* would then call the next mobile app to logout, and so on until all mobile apps have been called to logout.

Figure 13:
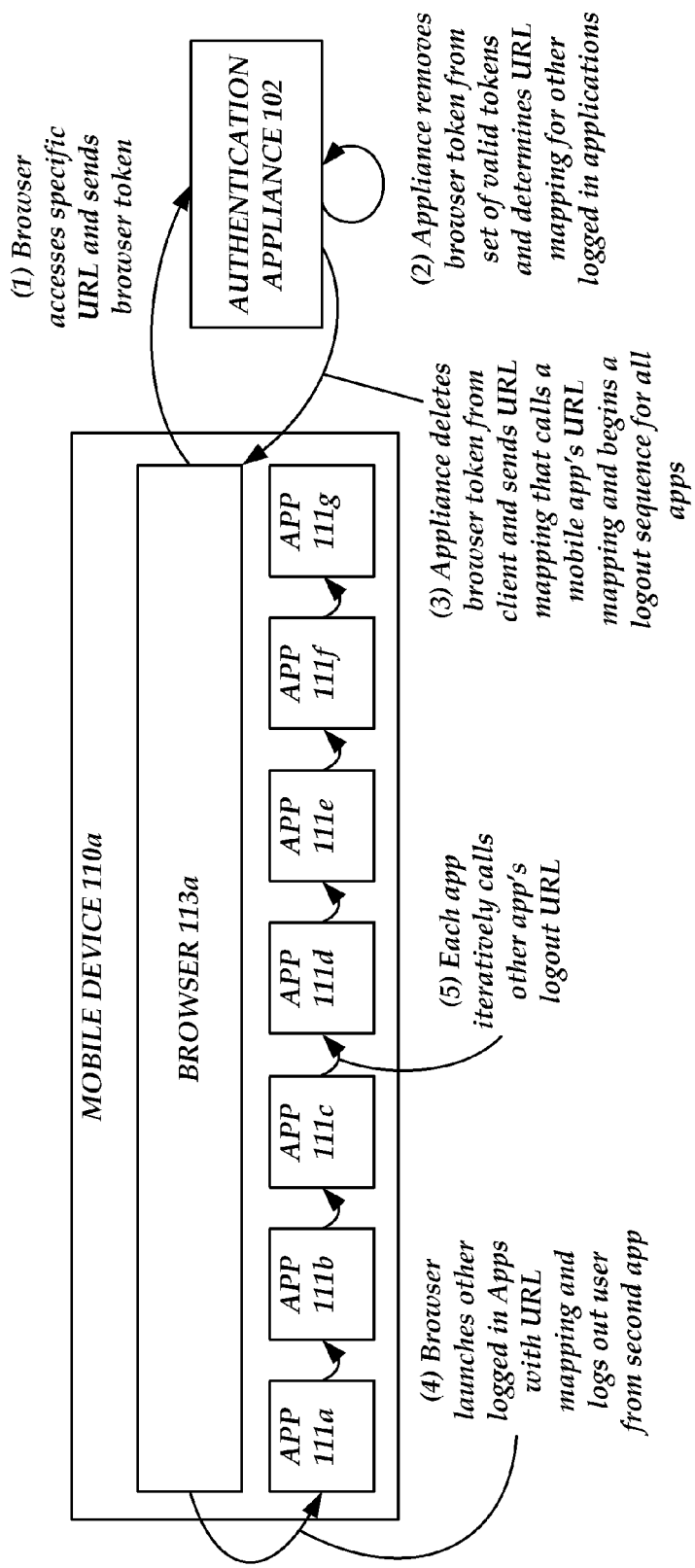
FIG. 13 is a flow diagram of an illustrative process for logging out multiple applications.

FIG. 13 is an illustration of an alternative embodiment to enable logout of multiple client applications without the need to reinvoke the browser or perform further queries of the authentication appliance. For these embodiments, the logout process may proceed similar to previous descriptions of the process, including having the browser access a specific URL and sending the persistent token (1). Once the appliance removes the browser token from the set of valid tokens, it may determine one or more URL mappings to have the browser/OS invoke. In some embodiments, the authentication appliance may determine a base URL mapping to be called. The base URL mapping may be a mapping associated with a client app executing on the mobile device that has asserted a client app identity to a network service or enterprise service/server. For example, client app 111*a* may be associated with a given URL mapping considered the base URL mapping. A base mapping, combined with a function or formula, may be used to calculate additional URL mappings without querying the authentication appliance, thus allowing a sequential trigger of logout indicators to progress from one logged in client app to another (4)-(5).

For example, authentication appliance 102 determines a base mapping for client app 111*a*. The authentication appliance may have assigned a URL mapping to 111*a* when it triggered a logon sequence, or have been preassigned and transferred to the authentication appliance by client app 111*a* or browser 113*a*. Authentication appliance 102 may then determine or lookup/retrieve an appropriate function to modify the base URL mapping. Such a function may be understood from the outside by the client apps themselves. For example, both the client apps and the authentication appliances may be programmed to understand that a particular function would govern URL mapping iteration. Alternatively, the particular function may be determined upon initial logon or initial configuration of a client app or authentication appliance. For example, an indicator of the appropriate function to use may be transferred to the client app along with the client app identity.

Continuing the example, the authentication appliance 102 then sends instructions to browser 113*a* to delete or nullify the browser session token for their login session. In addition, a URL is sent to the browser to be accessed which corresponds to a registered URL mapping by client app 111*a* (3). This URL mapping call may include an instruction, such as by inclusion of an HTTP GET parameter, to logout of the client app's associated network service as described above. After this logout process, client app 111*a* may use the function or formula to transform the URL mapping into a second URL mapping corresponding to a second client app, for example, client app 111*b*. For example, if the URL mapping for client app 111*a* was "ClientAppTrigger1", and the formula was to add "1" to the URL, client app 111*a* may calculate the next URL to be "ClientAppTrigger2". App 111*a* may now call the client app registered to the new URL mapping "ClientAppTrigger2", either via directing browser 113*a* to the new URL mapping, or calling the new URL mapping directly in the operating system, along with an instruction to logout from its associated network service or enterprise server. Client app 111*b* is then invoked by the call to its associated URL mapping, "ClientAppTrigger2". This client app may then logout of its associated network service or enterprise server, and then calculate the next URL mapping trigger using the same function (i.e. "ClientAppTrigger3"). The client app with that URL mapping will then be called, and so on (5). In this manner, all client applications currently logged in may be logged out from using client app identities that were associated with the deleted or nullified persistent token.

The exact formula/function may be a simple iterative addition of the URL mapping as described above, but more complex methods are also contemplated. For example, a hashing function may be used, where the next URL mapping is a hash of the previous URL mapping. Alternatively, a function or formulate need not be used. Instead, a file/table of all URL mappings used by all currently logged in applications may be stored on the mobile device, and accessed in order to retrieve and determine the next URL mapping to call in order to logout all applications. In some embodiments, all current URL mappings for client applications logged in using client app identifies may be stored on the authentica tion appliance. These URL mappings may be transferred to the browser in FIG. 12 step (3), and transferred between each client app during the logout process. Alternatively, each client app could query the authentication appliance to determine the next client app URL mapping to call for additional logouts.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, SD Card, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal or mobile device. In the alternative, the processor and the storage medium can reside as discrete components in a user terminal or mobile device.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer-implemented method for providing single-sign-on (SSO) authentication to a user of a client application on a mobile device, the computer-implemented method comprising:

receiving, from an independent browser on a mobile device, a first request to access a first uniform resource locator (URL) associated with a first non-browser mobile application executing on the mobile device;

authenticating the user interacting with the mobile device at least partly by: receiving first authentication information related to the user from the independent browser, and verifying the first authentication information with an identity database;

identifying a first URL mapping configured to invoke the first non-browser mobile application;

sending, to the independent browser, a browser-based token, the first URL mapping, and a first client application identity for use by the first non-browser mobile application;

receiving, from the independent browser on the mobile device, a second request to access a second uniform resource locator (URL) associated with a second non-browser mobile application executing on the mobile device, wherein the second request comprises the browser-based token;

verifying, with the identity database, non-revocation of the browser-based token;

identifying a second URL mapping configured to invoke the second non-browser mobile application; and sending, to the independent browser, a second client application identity for use by the second non-browser mobile application and the second URL mapping, said method performed in its entirety by a computer system that is separate from the mobile device, wherein the independent browser has not been specifically configured to provide identity information for non-browser mobile applications.

2. The method of claim 1, wherein the first uniform resource locator (URL) is identical to the second uniform resource locator (URL).

3. The method of claim 1, wherein the first non-browser mobile application and the second non-browser mobile application are distinct mobile applications.

4. The method of claim 1, further comprising sending, to the independent browser, a third uniform resource locator (URL) that is associated with a URL mapping for the first mobile application wherein the first URL mapping configured to invoke the first non-browser mobile application comprises a URL registered in the mobile device in association with the first non-browser mobile application.

5. The method of claim 1, wherein the first client application identity comprises one of an encrypted portion of a URL query string parameter.

6. The method of claim 1, wherein the first authentication information comprises a username, password, and one of: a portion of an SMS message, a knowledge based answer, a static pin, or a USB key.

7. The method of claim 1, further comprising receiving, from the independent browser, second authentication information that is different than the first authentication information.

8. The method of claim 1, further comprising sending, to the independent browser, a list of uniform resource locators for use by the first non-browser mobile application configured to trigger logout of one or more logged-in non-browser mobile applications.

9. A non-transitory computer storage medium which stores a program comprising executable code that directs a computing device to perform a process that provides single-sign-on (SSO) authentication to a user of a mobile device, comprising:

receiving, from an independent browser on a mobile device, a first request to access a first uniform resource locator (URL) associated with a first non-browser mobile application executing on a mobile device;

authenticating the user interacting with the mobile device by:
  receiving first authentication information related to the user from the independent browser,
  verifying the first authentication information with an identity database;

identifying a first URL mapping configured to invoke the first non-browser mobile application;

sending, to the independent browser, a browser-based token, the first URL mapping, and a first client application identity for use by the first non-browser mobile application;

receiving, from the independent browser on the mobile device, a second request to access a second uniform resource locator (URL) associated with a second non-browser mobile application executing on the mobile device, wherein the second request comprises the browser-based token;

verifying, with the identity database, non-revocation of the browser-based token;

identifying a second URL mapping configured to invoke the first non-browser mobile application;

and sending, to the independent browser, a second client application identity for use by the second non-browser mobile application and the second URL mapping, wherein the independent browser has not been specifically configured to provide identity information for non-browser mobile applications.

10. The non-transitory computer storage medium of claim 9, wherein the first uniform resource locator (URL) is identical to the second uniform resource locator (URL).

11. The non-transitory computer storage medium of claim 9, wherein the first non-browser mobile application and the second non-browser mobile application are distinct non-browser mobile applications.

12. The non-transitory computer storage medium of claim 9, which stores the program comprising executable code that directs the computing device to perform the process further comprising sending, to the independent browser, wherein the first URL mapping configured to invoke the first non-browser mobile application comprises a URL registered in the mobile device in association with the first non-browser mobile application a third uniform resource locator (URL) that is associated with a URL mapping for the first mobile application.

13. The non-transitory computer storage medium of claim 9, wherein the first client application identity comprises one of: a userid sent as a URL query string parameter, a userid sent as an encrypted URL query string parameter, a cookie, or an encrypted cookie.

14. The non-transitory computer storage medium of claim 9, wherein the first authentication information comprises a username, password, and one of: a portion of an SMS message, a knowledge based answer, a static pin, or a USB key.

15. The non-transitory computer storage medium of claim 9, which stores the program comprising executable code that directs the computing device to perform the process further comprising sending, to the independent browser, a plurality of distinct uniform resource locators, each uniform resource locator configured to trigger logout of a distinct logged-in non-browser mobile applications.

* * * * *